United States Patent
Tan et al.

(10) Patent No.: US 11,504,899 B1
(45) Date of Patent: *Nov. 22, 2022

(54) METHOD FOR FABRICATING LIGHTLY CROSSLINKED POLYIMIDES WITH PHENYLETHYNYL PENDANTS FOR SHAPE-MEMORY EFFECT AND PROGRAMMED ENHANCEMENT IN TG AND MODULUS

(71) Applicant: Government of the United States, as represented by the Secretary of the Air Force, Wright-Patterson AFB, OH (US)

(72) Inventors: Loon-Seng Tan, Centerville, OH (US); David H. Wang, Beavercreek, OH (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 321 days.

This patent is subject to a terminal disclaimer.

(21) Appl. No.: 16/752,737

(22) Filed: Jan. 27, 2020

Related U.S. Application Data

(60) Provisional application No. 62/908,183, filed on Sep. 30, 2019.

(51) Int. Cl.
*B29C 53/00* (2006.01)
*C08G 73/10* (2006.01)
(Continued)

(52) U.S. Cl.
CPC ........... *B29C 53/005* (2013.01); *B29C 35/02* (2013.01); *B29C 41/003* (2013.01); *B29C 41/02* (2013.01);
(Continued)

(58) Field of Classification Search
CPC .................. C08G 2280/00; C08L 2201/12
See application file for complete search history.

(56) References Cited

U.S. PATENT DOCUMENTS 5,567,800 A * 10/1996 Hergenrother .......... C07C 65/28
528/229
7,582,722 B1 * 9/2009 Tan ....................... C08G 73/101
528/423

(Continued)

OTHER PUBLICATIONS

Connell, J. W.; Smith, J. G., Jr.; Hergenrother, P. M.: Oligomers and polymers containing phenylethynyl groups. Journal of Macromolecular Science, Reviews in Macromolecular Chemistry and Physics 2000, C40, 207-230.

(Continued)

*Primary Examiner* — Benjamin A Schiffman
(74) *Attorney, Agent, or Firm* — AFMCLO/JAZ; James F. McBride

(57) ABSTRACT

The invention generally relates to shape memory films that are tri-functionally crosslinked and that comprise multiple, non-terminal, phenylethynyl moieties. In addition, the present invention relates methods of fabricating such films. Due to the improved properties of such SMPS, the SMP designer can program in to the SMP mechanical property enhancements that make the SMP suitable, among other things, for advanced sensors, high temperature actuators, responder matrix materials and heat responsive packaging.

16 Claims, 10 Drawing Sheets

(A)

Flow Chart for Construction of a Hollow SM Polyimide Cube (B)

Demonstration of SME in Polyimide Cube in Oil Bath at 215 °C

(51) Int. Cl.
*C08J 5/02* (2006.01)
*B29C 41/00* (2006.01)
*B29C 53/04* (2006.01)
*B29C 41/02* (2006.01)
*C08G 73/12* (2006.01)
*C08G 73/14* (2006.01)
*B29C 41/12* (2006.01)
*B29C 41/46* (2006.01)
*B29C 35/02* (2006.01)
*B29C 41/42* (2006.01)
*B29K 79/00* (2006.01)
*B29K 105/24* (2006.01)
*B29K 105/00* (2006.01)

(52) U.S. Cl.
CPC .............. *B29C 41/12* (2013.01); *B29C 41/42* (2013.01); *B29C 41/46* (2013.01); *B29C 53/04* (2013.01); *C08G 73/101* (2013.01); *C08G 73/1067* (2013.01); *C08G 73/1071* (2013.01); *C08G 73/121* (2013.01); *C08G 73/124* (2013.01); *C08G 73/14* (2013.01); *C08J 5/02* (2013.01); *B29C 2791/001* (2013.01); *B29C 2791/004* (2013.01); *B29K 2079/08* (2013.01); *B29K 2105/0061* (2013.01); *B29K 2105/24* (2013.01); *B29K 2995/0094* (2013.01); *C08G 73/127* (2013.01); *C08G 2220/00* (2013.01); *C08G 2280/00* (2013.01); *C08J 2379/08* (2013.01); *C08L 2201/12* (2013.01)

(56) References Cited

U.S. PATENT DOCUMENTS

| | | | |
|---|---|---|---|
| 7,678,873 B1 * | 3/2010 | Tan | C08G 73/1046 528/128 |
| 8,102,753 B2 * | 1/2012 | Duerig | G11B 9/1454 369/127 |
| 8,129,496 B2 * | 3/2012 | Duerig | G11B 11/007 528/125 |
| 8,502,401 B2 * | 8/2013 | Burgoyne, Jr. | C08L 71/00 528/125 |
| 8,546,614 B1 | 10/2013 | Tan et al. | |
| 8,668,981 B2 | 3/2014 | Karst et al. | |
| 8,791,227 B1 | 7/2014 | Tan et al. | |
| 8,815,999 B2 * | 8/2014 | Rosenberg | C08G 73/1085 549/429 |
| 8,962,890 B1 | 2/2015 | Tan et al. | |
| 10,239,254 B1 | 3/2019 | Tan et al. | |
| 10,294,255 B1 | 5/2019 | Tan et al. | |
| 10,988,437 B1 * | 4/2021 | Tan | C08G 73/1025 |
| 2015/0284498 A1 | 10/2015 | Weiss et al. | |
| 2016/0369055 A1 | 12/2016 | Leng et al. | |
| 2020/0172667 A1 * | 6/2020 | Das | C08G 65/485 |

OTHER PUBLICATIONS

Smith, J. G., Jr.; Connell, J W.: Chemistry and properties of imide oligomers from phenylethynyl-containing diamines. High Performance Polymers 2000, 12, 213-223.

Bai, Y.; Mao, L.; Liu, Y.: High temperature shape memory polyimide ionomer. Journal of Applied Polymer Science 2016, 133, DOI: 10.1002/APP.43630.

Kong, D.; Xiao, X.: High Cycle-life Shape Memory Polymer at High Temperature. Scientific Reports 2016, 6, 33610pp.

Xiao, X.; Qiu, X.; Kong, D.; Zhang, W.; Liu, Y.; Leng, J.: Optically transparent high temperature shape memory polymers. Soft Matter 2016, 12, 2894-2900.

Wang, Q.; Bai, Y.; Chen, Y.; Ju, J.; Zheng, F.; Wang, T.: High performance shape memory polyimides based on π-π interactions. Journal of Materials Chemistry A: Materials for Energy and Sustainability 2015, 3, 352-359.

Xiao, X.; Kong, D.; Qiu, X.; Zhang, W.; Zhang, F.; Liu, L.; Liu, Y.; Zhang, S.; Hu, Y.; Leng, J.: Shape-Memory Polymers with Adjustable High Glass Transition Temperatures. Macromolecules (Washington, DC, United States) 2015, 48, 3582-3589.

Koerner, H.; Strong, R. J.; Smith, M. L.; Wang, D. H.; Tan, L.-S.; Lee, K. M.; White, T. J.; Vaia, R. A.: Polymer design for high temperature shape memory: Low crosslink density polyimides. Polymer 2013, 54, 391-402.

Yoonessi, M.; Shi, Y.; Scheiman, D. A.; Lebron-Colon, M.; Tigelaar, D. M.; Weiss, R. A.; Meador, M. A.: Graphene Polyimide Nanocomposites; Thermal, Mechanical, and High-Temperature Shape Memory Effects. ACS Nano 2012, 6, 7644-7655.

* cited by examiner

US 11,504,899 B1

METHOD FOR FABRICATING LIGHTLY CROSSLINKED POLYIMIDES WITH PHENYLETHYNYL PENDANTS FOR SHAPE-MEMORY EFFECT AND PROGRAMMED ENHANCEMENT IN TG AND MODULUS

CROSS-REFERENCE TO RELATED APPLICATION

The present application claims priority to U.S. Provisional Application Ser. No. 62/908,183 filed Sep. 30, 2019, the contents of which is hereby incorporated by reference in its entry.

RIGHTS OF THE GOVERNMENT

The invention described herein may be manufactured and used by or for the Government of the United States for all governmental purposes without the payment of any royalty.

FIELD OF THE INVENTION

The invention generally relates to shape memory polymers that are tri-functionally crosslinked and that comprise non-terminal, phenylethynyl moieties. In addition, the present invention relates methods of fabricating such polymers.

BACKGROUND OF THE INVENTION

Shape memory polymers (SMPs) are a class of active materials that can be programmed to "fix" a temporary shape or a series of temporary shapes, and then later to recover to a "memorized" permanent shape established by a covalent or physical network by applying an environmental stimulus, for example, heat to the SMP. Unfortunately current SMPs are not suitable for all applications as they do not offer the desired level and combination of sustainable, high temperature mechanical properties needed for current applications.

Applicants recognized that the source of the aforementioned problems was that the current SMPs were not self-thermosetting. Applicants discovered that such problems could be effectively solved by adding the combination of tri-functional crosslinking and non-terminal, phenylethynyl moieties to certain SMPs. While not being bound by theory, Applicants believe that the tri-functional crosslinking adds shape memory and non-terminal, phenylethynyl moieties when crosslinked increase the SMP's modulus of elasticity and allow the designer to program in to the SMP sustainable, mechanical property enhancements. As a result, Applicants disclose herein, SMPs that are suitable, among other things, for advanced sensors, responder applications and heat responsive packaging.

SUMMARY OF THE INVENTION

The invention generally relates to shape memory films that are tri-functionally crosslinked and that comprise multiple, non-terminal, phenylethynyl moieties. In addition, the present invention relates to methods of fabricating such films. Due to the improved properties of such SMPs, the SMP designer can program in to the SMP mechanical property enhancements that make the SMP suitable, among other things, for advanced sensors, high temperature actuators, responder matrix materials and heat responsive packaging.

BRIEF DESCRIPTION OF THE DRAWINGS

The accompanying drawings, which are incorporated in and constitute a part of this specification, illustrate embodiments of the invention and, together with the summary given above, and the detailed description given below, serve to explain the invention.

X denotes crosslinked. This example pertains to generation of either amine-terminated or anhydride-terminated polymer blend that reacts fully with stoichiometric amount of a trianhydride crosslinker (POTAn) or triamine crosslinker (POTAm), respectively.

Figure 4:
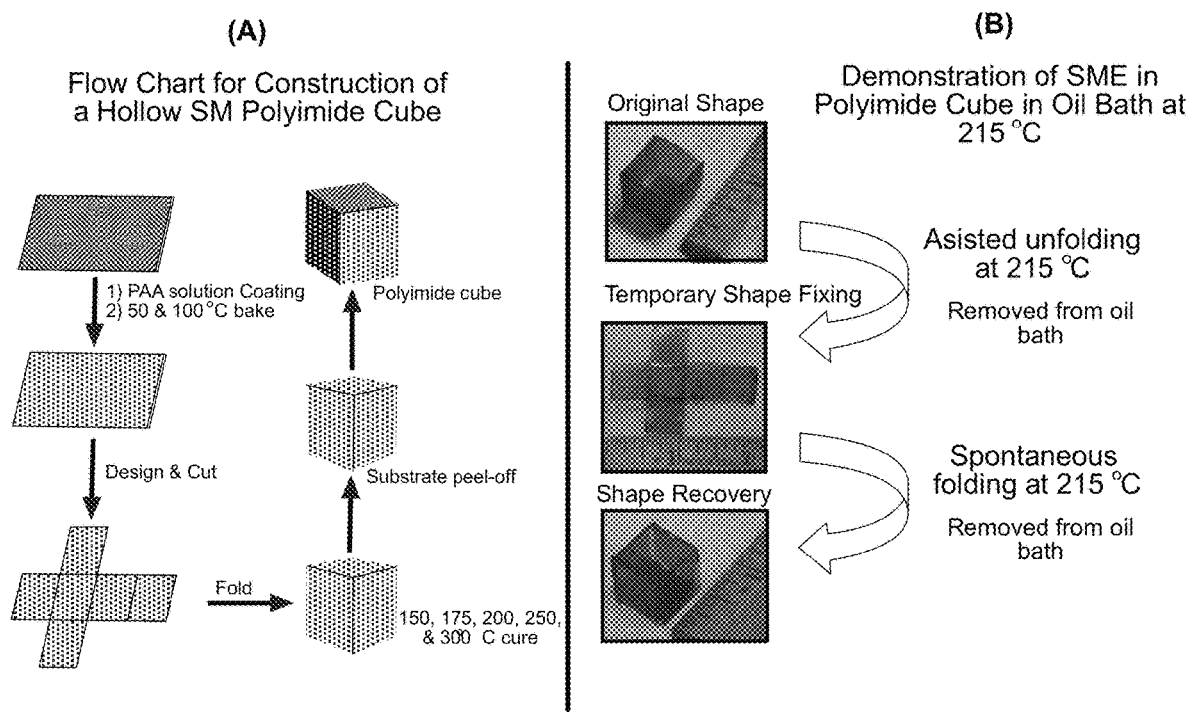
Figure 5:
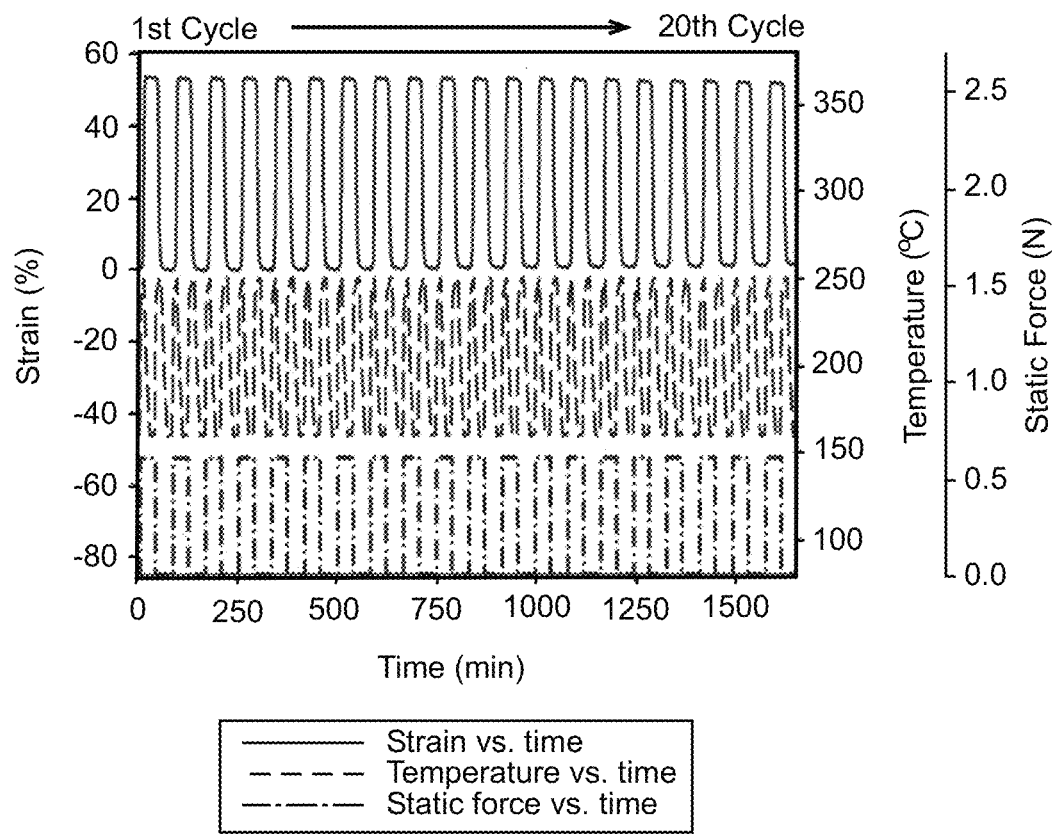

FIG. 4 illustrates a flow chart for the construction of a six-sided box via poly(amic acid)/crosslinking/polyimide processing chemistry, in accordance with another embodiment of the invention;

FIG. 5 is a two-dimensional plot of Strain (%), Static Force (N), and Temperature (° C.) versus time showing data from a demonstration of change of strain, stress, with temperature and time on a dynamic mechanical analyzer (DMA) using a sample film of PE25-XCP2-Am5, which was processed in accordance with an embodiment of the present invention. X denotes crosslinked. The shape memory performance was evaluated by 20 stress-strain-temperature (SST) cycles. at 250° C. (above the initial glass transition temperatures (~224° C.) but ~50° C. below the typical onset temperature observed for the thermal curing of phenylethynyl thermosetting polymers) was used as the triggering temperature.

Figure 6:
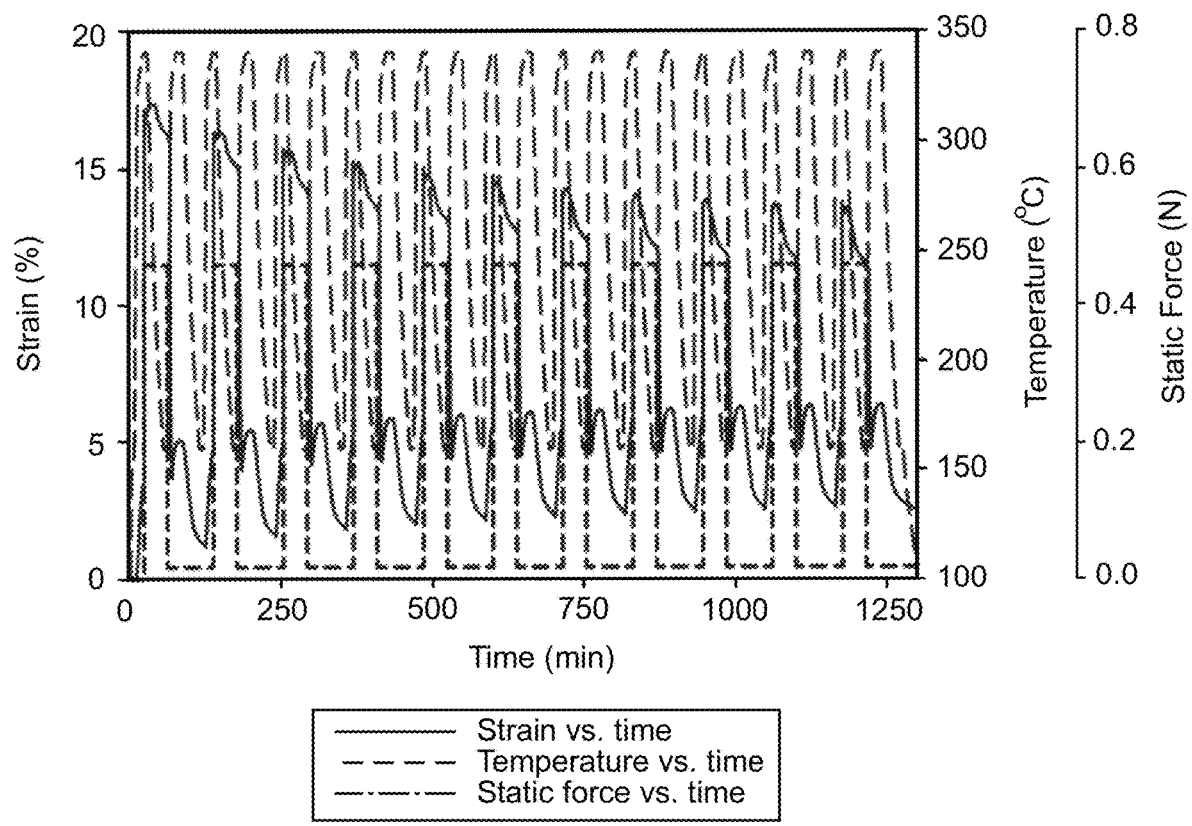

FIG. 6 is a two-dimensional plot of Strain (%), Static Force (N), and Temperature (° C.) versus time showing data from a demonstration of change of strain, stress, with temperature and time of the same sample film of PE25-XCP2-Am5 on a dynamic mechanical analyzer (DMA). X denotes crosslinked. The shape memory performance was evaluated by 22 stress-strain-temperature (SST) cycles at 340° C. (~peak temperature (~350° C.) for the thermal curing of phenylethynyl thermosetting polymers) was used as the triggering temperature.

Figure 7:
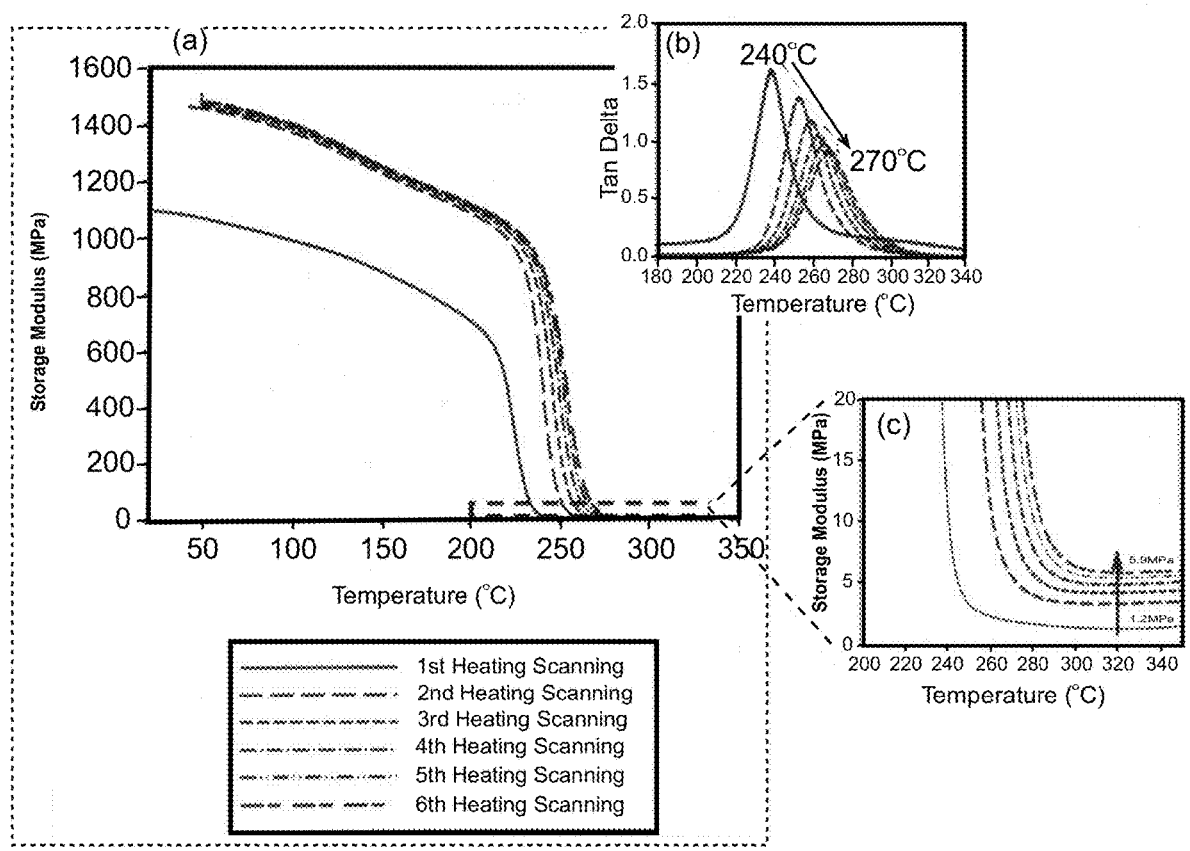

FIG. 7 shows (a) Composite DMA (Storage Modulus, E' versus Temperature) plot of six heating scans of PE25-XCP2-Am5; (b) Tan δ vs. Temperature plot indicating progressively increasing $T_g$; (c) expanded view of the post-Tg region showing progressive elevation of modulus plateau. X denotes crosslinked.

Figure 8:
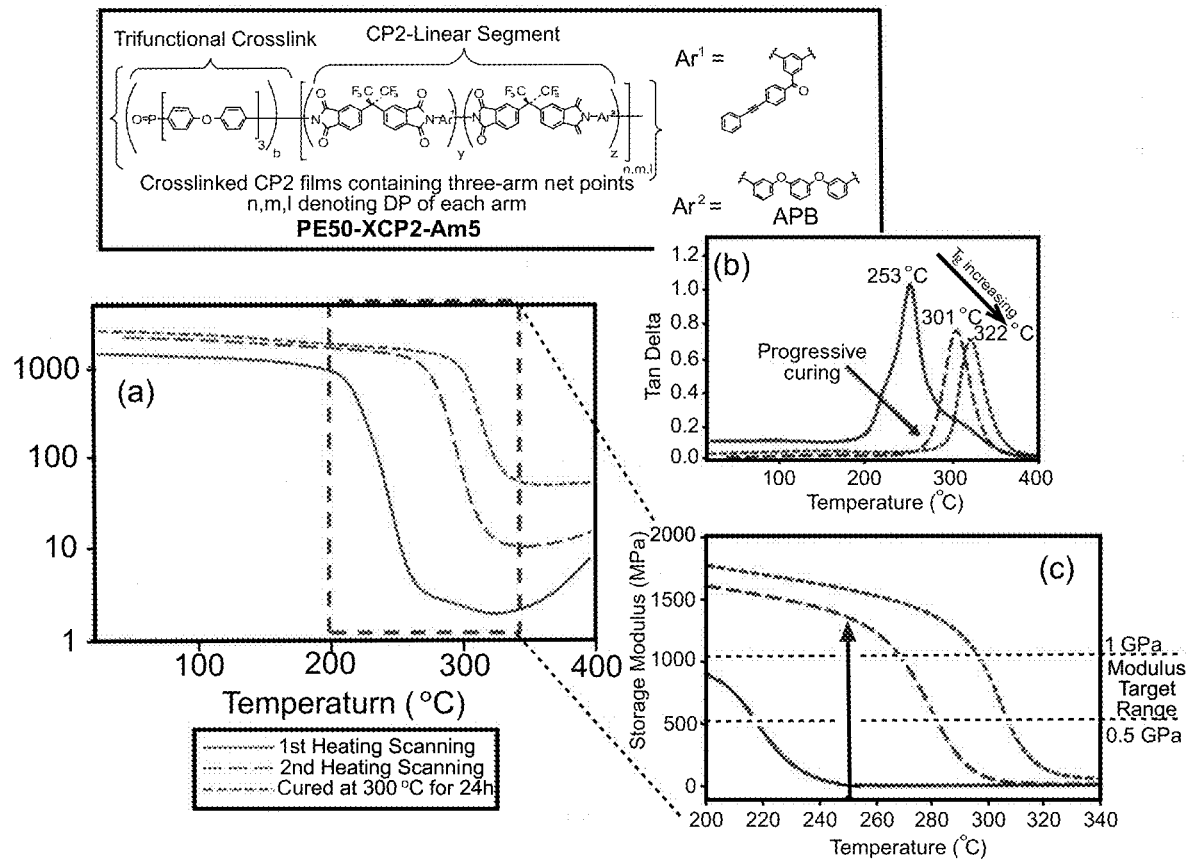

FIG. 8 shows (a) Composite DMA (Storage Modulus, E' versus Temperature) plot of three heating scans of PE50-XCP2-Am5; (b) Tan δ vs. Temperature plot indicating progressively increasing $T_g$; (c) expanded view of the post-Tg region showing progressive elevation of modulus plateau. X denotes crosslinked.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Method of Fabricating a Shape Memory Polymer

For purposes of this specification, headings are not considered paragraphs and thus this paragraph is Paragraph 0023 of the present specification. The individual number of each paragraph above and below this paragraph can be determined by reference to this paragraph's number. In this paragraph 0023, Applicants disclose a method for fabricating a shape memory polymer into a three-dimensional object, comprising:

a) treating a solution comprising:
(i) a polymeric intermediate comprising repeat units and non-terminal, phenylethynyl moieties, each of said repeat units comprising one of said non-terminal, phenylethynyl moieties; said polymeric intermediate can be selected from the group consisting of a poly(amic acid) intermediate, said poly(amic acid) intermediate being a reaction product of an aromatic diamine monomer and a di-anhydride-containing monomer either said aromatic diamine monomer or said di-anhydride-containing monomer comprising a phenylethynyl moiety); a poly(amide-amic acid) intermediate, said poly(amide-amic acid) can be a reaction product of an aromatic diamine monomer and a (anhydride-acid chloride) containing monomer, either said aromatic diamine monomer or said (anhydride-acid chloride) containing monomer comprising a phenylethynyl moiety); a copolymer intermediate of poly(amic acid) and poly(amide-amic acid) and mixtures thereof, said poly(amic acid) can be a reaction product of an aromatic diamine monomer and a di-anhydride-containing monomer either said aromatic diamine monomer or said di-anhydride-containing monomer comprising a phenylethynyl moiety and said poly(amide-amic acid) can be a reaction product of an aromatic diamine monomer and a (anhydride-acid chloride) containing monomer, either said aromatic diamine monomer or said (anhydride-acid chloride) containing monomer comprising a phenylethynyl moiety), preferably said polymeric intermediate is terminally anhydride functionalized or amine functionalized;
(ii) a solvent, preferably a polar aprotic solvent, more preferably N,N-dimethylformamide (DMF), N,N-dimethylacetamide (DMAc), and/or N-methylpyrrolidone (NMP)

with a multi-functional crosslinking agent to thereby form a sol-gel comprising a crosslinked poly(amic acid), a crosslinked poly(amide-amic acid) and/or a crosslinked copolymer of poly(amic acid) and poly(amide-amic acid), said crosslinked poly(amic acid), a crosslinked poly(amide-amic acid) and/or a crosslinked copolymer of poly(amic acid) and poly(amide-amic acid) comprising repeat units and non-terminal, phenylethynyl moieties each of said repeat units comprising one of said non-terminal, phenylethynyl moieties, said multi-functional crosslinking agent comprising at least a tri-functionalized amine crosslinking agent when said polymeric intermediate is anhydride end-functionalized and said multi-functional crosslinking agent comprising at least a tri-functionalized anhydride crosslinking agent when said polymeric intermediate is amine end-functionalized, preferably said crosslinking agent comprises a phosphine-oxide triamine or a phosphine-oxide trianhydride;

b) forming a film of said sol-gel on a substrate to provide a laminated substrate;

c) evaporating at least a portion of the solvent from the sol-gel by heating the sol-gel to a temperature in a range of about 50° C. to about 100° C. at a pressure less than about atmospheric pressure;

d) forming the laminated substrate into a first configuration that is in a three-dimensional form;

e) imidizing, via heating, said sol-gel to provide the shape memory polymer having a permanent shape corresponding to the first configuration, wherein the shape memory polymer comprises a crosslinked polyimide, a crosslinked poly(amide-imide) and/or a crosslinked polyimide poly(amide-imide) copolymer comprising repeat units and non-terminal, phenylethynyl moieties each of said repeat units comprising one of said non-terminal, phenylethynyl moieties; and f) removing the substrate from the laminated substrate to provide the three-dimensional object comprising the shape memory polymer, preferably said removal comprises chemically removing the substrate from the laminated substrate;

g) optionally, heating said shape memory polymer to a temperature of from about 210° C. to 250° C. and then placing said shape memory polymer under tension to a new shape, preferably a two dimensional object and the freezing said shape memory polymer.

Applicants disclose a method for fabricating a shape memory polymer into a three-dimensional object according to Paragraph 0023 further comprising crosslinking said non-terminal, phenylethynyl moieties by heating said substrate to a temperature of from greater than 250° C. to about 400° C., preferably 290° C. to about 325° C., more preferably from about 295° C. to about 305° C., preferably said temperature is maintained for about from 1 hour to about 72 hours. In one aspect, said imidizing comprises heating said crosslinked poly(amic acid) to temperatures of about 150° C., about 175° C., about 200° C., and/or about 250° C., and maintaining each of said temperatures for about one hour. With this step, the shape memory polymer self-folds into a three-dimensional object if it is supplied in non-three dimensional form at approximately 25° C. If the shape memory polymer is supplied in a three dimensional form at approximately 25° C. the three dimensional shape is locked in and the modulus of elasticity will increase after being placed in an environment with temperature of near or greater than 250° C. to about 400° C.

Applicants disclose the method of Paragraphs 0023 through 0024, wherein the substrate comprises a metal that dissolves in an aqueous acid solution, preferably said metal comprises aluminum.

Applicants disclose the method of Paragraphs 0024 through 0025, wherein the multi-functional anhydride crosslinking agent has the following chemical formula:

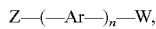
Z—(—Ar—)$_n$—W, wherein Z represents an anhydride functional group that is directly or indirectly bonded to Ar; Ar represents an aryl group that is directly bonded to W; and n is equal to 3 when W is P=O or N, or n is equal to 4 when W is Si or a carbon moiety.

Applicants disclose the method according to Paragraph 0026 wherein Ar is a phenyleneoxy group (—OPh-) that is para- or meta-substituted with respect to oxygen, and the multi-functional anhydride crosslinking agent has the following chemical formula:

Z—(—OPh-)$_n$—W.

Applicants disclose the method according to Paragraph 0026 wherein Z and Ar in combination form a phthalic anhydride moiety that is directly bonded to W.

Applicants disclose the method according to Paragraph 0026 wherein Ar is a phenyleneoxy group (—OPh-) that is para- or meta-substituted with respect to oxygen, and wherein Z is a phthalic anhydride group that is connected to the phenyleneoxy group through an ether bond.

Applicants disclose the method according to Paragraph 0026 wherein W is P=O, wherein Ar is a phenyleneoxy group (—OPh-) that is para- or meta-substituted with respect to oxygen, and wherein the multi-functional anhydride crosslinking agent has the following chemical formula:

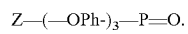
Z—(—OPh-)$_3$—P=O.

Applicants disclose the method according to Paragraph 0030 wherein Z is a phthalic anhydride group that is connected to the phenyleneoxy group through an ether bond, and wherein the multi-functional anhydride crosslinking agent has the following chemical formula:

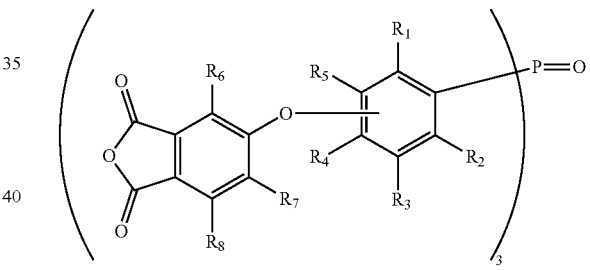

wherein R$_1$ through R$_8$ are each independently selected from H or C$_1$-C$_4$ alkyl.

Applicants disclose the method according to Paragraph 0031 wherein the agent is selected from tris[3-(3,4-dicarboxyphenoxy)phenyl]phosphine oxide trianhydride or tris[4-(3,4-dicarboxyphenoxy)phenyl]phosphine oxide trianhydride.

Applicants disclose the method according to Paragraph 0026 wherein W is N, wherein Ar is a phenyleneoxy group (—OPh-) that is para- or meta-substituted with respect to oxygen, and wherein the multi-functional anhydride crosslinking agent has the following chemical formula:

Z—(—OPh-)$_3$—N.

Applicants disclose the method according to Paragraph 0033 wherein Z is a phthalic anhydride group that is connected to the phenyleneoxy group through an ether bond, and wherein the multi-functional anhydride crosslinking agent has the following chemical formula:

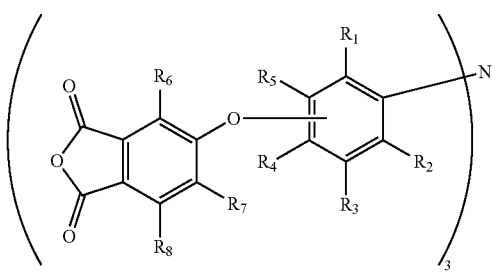

wherein $R_1$ through $R_8$ are each independently selected from H or $C_1$-$C_4$ alkyl.

Applicants disclose the method according to Paragraph 0033 wherein the multi-functional anhydride crosslinking agent is selected from tris[3-(3,4-dicarboxyphenoxy)phenyl]amine trianhydride or tris[4-(3,4-dicarboxyphenoxy)phenyl]amine trianhydride.

Applicants disclose the method according to Paragraph 0026 wherein W is N, wherein Z and Ar in combination form a phthalic anhydride moiety that is directly bonded to N, and wherein the multi-functional anhydride crosslinking agent has the following chemical formula:

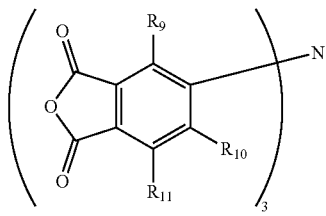

wherein $R_9$ to $R_{11}$ are each independently selected from H or $C_1$-$C_4$ alkyl.

Applicants disclose the method according to Paragraphs 0023 through 0024 wherein the multi-functional amine crosslinking agent comprises a tri(oxybenzene-amine) crosslinker having the following chemical formula:

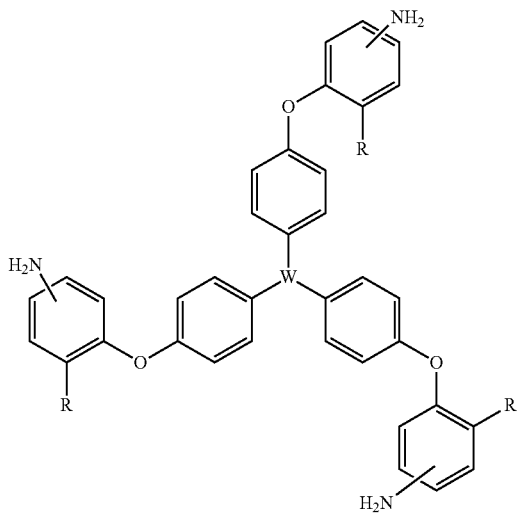

wherein W is selected from a group consisting of $CH_3C$, N, P=O, or $BO_3$; R is selected from a group consisting of H, F, Cl, $CF_3$, or $CH_3$; and the amine groups are located meta or para with respect to R.

The formation of the laminated substrate may be based on origami techniques. As commonly known, origami is a Japanese art based on folding paper, but in recent years, the concept has been advanced beyond artistic creations and toys such that three-dimensional, complex objects now can be designed to be capable of on-command transformation into a wide range of devices and robotic systems. Easily taken for granted examples to illustrate the utility of origami concept can be found in foldable maps, shopping bags, storage boxes and cartons, etc. More advanced examples such as automobile airbags, shock absorbers, 3D and light-trapping photovoltaics, and biomedical devices/implants such as stent further illustrate the ingenuous application of origami engineering concept. In general, origami concept is best used to solve technological problems that require solutions to (i) small-volume packaging for (ii) efficient storage and (iii) transportation, (iv) easy deployment, and in some cases (v) reusability. The most attractive features of origami concept are (i) it is scale-free, applicable from nanoscale level (protein folding and DNA origami) to kilometer-scale (solar panels) and (ii) applicable to various printing techniques.

Fundamentally, origami can be considered as a process that involves a sequence of folding steps (i.e. programmed fold or crease pattern) to eventually transform a 2-D substrate to the designed 3-D object. Therefore, important to 2D-to-3D transformation process is shape memory effect, and naturally, a requisite characteristic of the polymer substrate for origami-inspired fabrication is to have a shape-memory capability. The notion of imparting elastomer-like shape memory effect to thermoplastic or crosslinked polymers may be based on three different mechanisms: thermal, photothermal, and photochemical mechanisms.

Sol-Gel, Film and Two and Three Dimensional Objects

Applicants disclose a sol-gel comprising a tri-functionally crosslinked poly(amic acid), a tri-functionally crosslinked poly(amide-amic acid) and/or a tri-functionally crosslinked copolymer of poly(amic acid) and poly(amide-amic acid), said tri-functionally crosslinked poly(amic acid), tri-functionally crosslinked poly(amide-amic acid) and/or tri-functionally crosslinked copolymer of poly(amic acid) and poly(amide-amic acid) comprising repeat units and non-terminal, phenylethynyl moieties each of said repeat units comprising one of said non-terminal, phenylethynyl moieties.

Applicants disclose a film derived from a sol-gel according to Paragraph 0040.

Applicants disclose a two or three dimensional object derived from the sol-gel according to Paragraph 0040.

Applicants disclose a two or three dimensional object derived from the film according to Paragraph 0041.

Crosslinked Polyimide and Poly(Amide-Imide) Polymers and Co-Polymers

Because of the similar polymerization chemistry to generate polyimides and poly(amide-imides), and co-polymers of polyimides and poly(amide-imides) the multi-functional crosslinking agents disclosed herein may be used to crosslink these classes of polymers to create covalent network structures capable of showing shape memory effects and crosslinking of the phenylethynyl (PE) moieties at elevated temperatures.

Synthesis of a polyimide is typically accomplished by polymerization of a PE-containing diamine and a dianhydride in a 1:1 molar ratio to generate a poly(amic acid)

precursor, which is then converted to the corresponding polyimide typically by either thermal cure (e.g., by heating to >200° C. in solution or solid state) or chemical imidization using a dehydrating agent or promoter such as acetic anhydride/triethylamine or acetic anhydride/pyridine. However, to generate a polyimide having the desired amount of crosslinking at room temperature, an appropriately-terminated poly(amic acid) precursor is first generated by off-setting the dianhydride: PE-diamine ratio. For example, to provide an amine-terminated poly(amic acid) precursor, the amount of PE-diamine is used in excess to cap both ends of the poly(amic acid) precursor. An appropriate amount of a multi-anhydride crosslinking agent is then added to the precursor solution so that all or substantially all of the terminal amine groups will be consumed. Conversely, to provide an anhydride-terminated poly(amic acid) precursor, the amount of di-anhydride-containing monomer is used in excess to cap both ends of the poly(amic acid) precursor. Then an appropriate amount of a multi-amine crosslinking agent is then added to the precursor solution so that all or substantially all of the terminal anhydride groups will be consumed. In either embodiment, crosslinked polyimides may then be created using appropriate imidization conditions.

In another embodiment, synthesis of a co-polyimide is typically accomplished by polymerization of a PE-containing diamine, a non-PE diamine, and a dianhydride in an appropriate molar ratio to generate an either amine-terminated or anhydride-terminated a poly(amic acid) precursor, which is then converted to the corresponding polyimide typically by either thermal cure (e.g., by heating to >200° C. in solution or solid state) or chemical imidization using a dehydrating agent or promoter such as acetic anhydride/ triethylamine or acetic anhydride/pyridine.

For generating the amine-terminated poly(amic acid), the appropriate molar ratio for the dianhydride (a moles), PE-diamine (x moles), non-PE diamine (y moles) and trianhydride crosslinker (b moles) follows the stoichiometric relations: x+y=100 mol % and a +(3/2)b=100 mol %.

For generating the anhydride-terminated poly(amic acid), the appropriate molar ratio for the dianhydride (a moles), PE-diamine (x moles), non-PE diamine (y moles) and trianhydride crosslinker (b moles) follows the stoichiometric relations: a=100 mol % and x+y+(3/2)b=100 mol %.

In accordance with an aspect of the polymer, the diamine monomer comprises an aromatic diamine, which includes, but is not limited to, 1,3-bis(3-aminophenoxy)benzene (APB); 1,4-bis(3-aminophenoxy)benzene; 1,2-bis(3-aminophenoxy)benzene; 1,2-bis(4-aminophenoxy)benzene; 1,3-bis(4-aminophenoxy)benzene; 1,4-bis(4-aminophenoxy)benzene; 3,4'-oxydianiline; 4,4-oxydianiline; 1,3-diamino-4-methylbenzene; 1,3-diamino-4-(trifluoromethyl)benzene; 2,4-diaminobiphenyl; 2,2-bis(4-aminophenyl)-1,1,1,3,3,3-hexafluoropropane; 2,2-bis(4-aminophenyl)propane; 2,2-bis[4-(4-aminophenoxy)phenyl]-1,1,1,3,3,3-hexafluoropropane; 2,2-bis[4-(4-aminophenoxy)phenyl]propane; or a mixture of thereof.

In accordance with another aspect, the dianhydride monomer includes, but is not limited to 2,2-[bis(4-phthalic anhydrido)]-1,1,1,3,3,3-hexafluoroisopropane (6FDA); 4,4'-oxybis(phthalic anhydride); 3,3',4,4'-diphenylsulfone tetracarboxylic dianhydride; 3,3',4,4'-benzophenone tetracarboxylic dianhydride; 4,4'-(2,2,2-trifluoro-1-phenylethylidene)bis[phthalic anhydride]; 2,2-bis[4-(3,4-dicarboxyphenoxy)phenyl]propane dianhydride; 4,4'-(p-phenylenedioxy)bis[phthalic anhydride]; 4,4'-(m-phenylenedioxy)bis[phthalic anhydride]; 4,4'-(o-phenylenedioxy)bis[phthalic anhydride]; or mixtures thereof.

The synthesis of a poly(amide-imide) is typically accomplished by polymerization of i) a diamine and a trimellitic anhydride (TMA) or trimellitic anhydride acid chloride (TMAC); or ii) a diamine and a diimide-dicarboxylic acid monomer derived from a selective condensation of TMA and an aromatic diamine (e.g., $H_2N$—Ar—$NH_2$). When acid monomers are used, the polymerization process is aided by triethylphosphite/pyridine (Yamazaki-Higashi reagent) in a 1:1 molar ratio in an amide solvent such as N,N-dimethylformamide (DMF), N,N-dimethylacetamide (DMAc), N-methylpyrrolidone (NMP), etc.

Persons having ordinary skill in the art will appreciate that these polymerization methods may be applied to other dianhydride monomers containing pre-formed aromatic amide moieties. For example, bis(phthalic anhydride) monomers with preformed amide as part of the linking group, which are also known as diamide-dianhydrides (DADA), can be prepared from trimellitic anhydride acid chloride (TMAC) and an aromatic diamine (e.g., $H_2N$—Ar—$NH_2$) in refluxing acetone with pyridine as HCl scavenger.

However, to generate a poly(amide-imide) having the desired amount of crosslinking, an appropriately-terminated poly(amide-imide) may be first generated via Yamazaki-Higashi reaction by off-setting TMA:diamine ratio. To make the amine-terminated poly(amide-imide), the amount of diamine is in excess to cap both ends of the polymer. After the amino-terminated polyamide has been isolated by precipitation in methanol and filtration, it is washed with methanol and dried in vacuo overnight. The amino-terminated polyamide can then be dissolved or suspended in an amide solvent and mixed with an amide solution of a multi-anhydride crosslinking agent in an appropriate amount so that all or substantially all of the terminal amine groups are consumed, which is immediately followed by casting and thermal curing under reduced pressure to create crosslinked poly(amide-imide) films. Conversely, to make the anhydride-terminated poly(amide-imide), the amount of amine monomer is not used in excess and thus is the limiting reagent.

Figure 3:
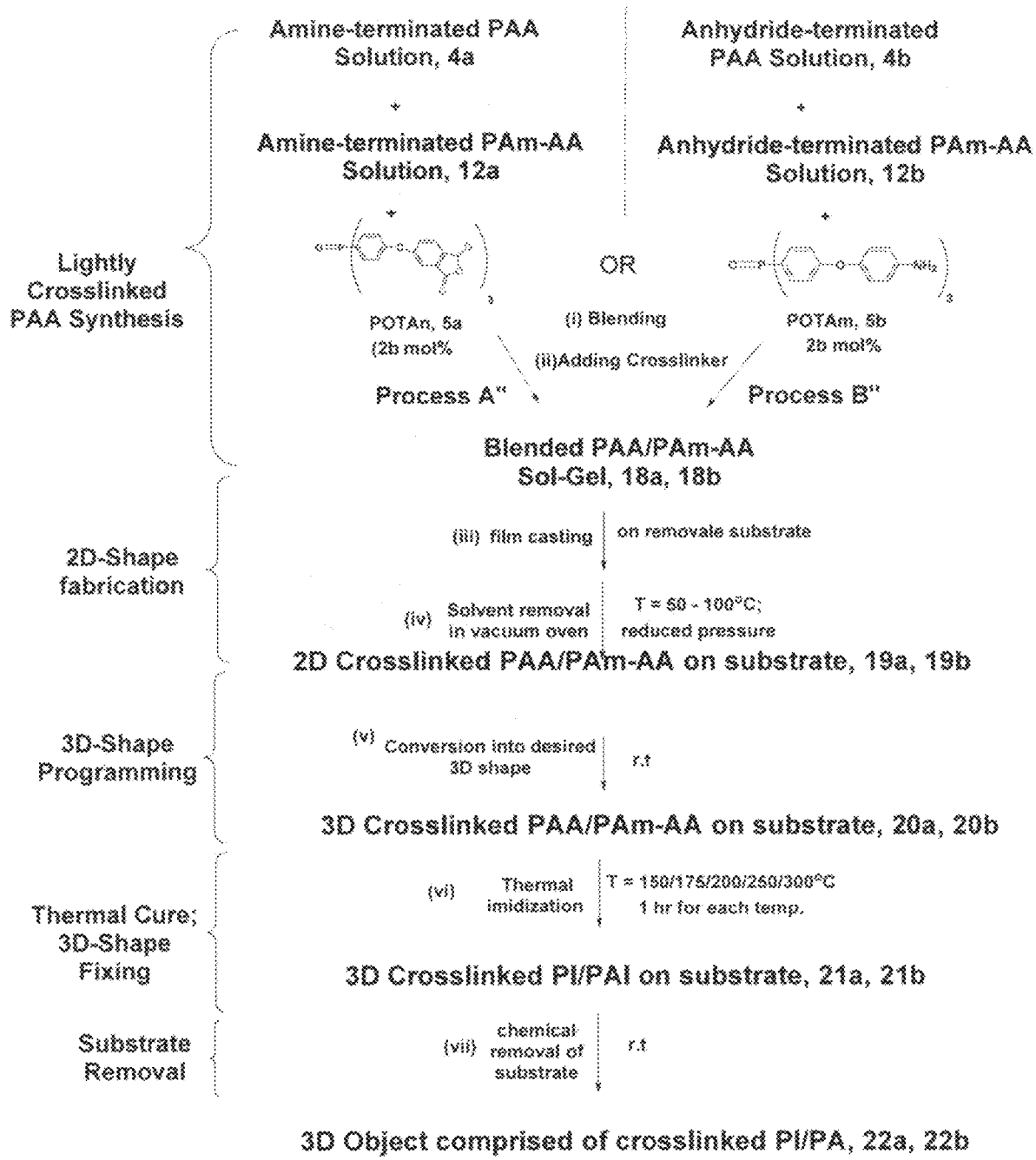
FIG. 3 is an exemplary scheme depicting the integrated process that combines the in-situ synthesis of a blend of lightly crosslinked poly(amic acid) (PAA) and poly(amide-amic acid) (PAm-AA), steps (i) blending-(ii) adding crosslinker, and fabrication of 3D object comprised of crosslinked polyimide/poly(amide-imide) (3D-XPI/XPAI): 2D (film) and 3D object fabrication, steps (iii)-(iv) and steps (v)-(vi), respectively, and removal of supporting substrate, step (vii).

In a preferred method to generate a poly(amide-imide) having the desired amount of crosslinking, it is more suitable that an appropriately-terminated poly(amide-amic acid) is first generated by off-setting the DADA: diamine ratio so that either diamide-dianhydride or diamine is in excess. In the former case, anhydride-terminated poly(amide-amic acid) is generated, and in the latter case, amine-terminated poly(amide-amic acid). Then an appropriate amount of a multi-amine crosslinking agent or multi-anhydride crosslinking agent is then added to the respective precursor solution so that all or substantially all of the reactive terminal groups will be consumed. (See Paragraphs 0046 and 0047 for the stoichiometric relations for determining the appropriate amounts of DADA, PE-diamine, nonPE-diamine and trifunctional crosslinker.) This is immediately followed by casting and thermal curing under reduced pressure to create crosslinked poly(amide-imide) films. The reaction stoichiometry for generating In another embodiment as depicted in FIG. 3, a crosslinked copolymers comprised of a polyimide and a poly(amide-imide) can be prepared by mixing (A) an amine-terminated poly(amic acid) and an amine-terminated poly(amide-imide) followed by addition of a trianhydride crosslinker or (B) an anhydride-terminated poly(amic acid) and an anhydride-terminated poly(amide-imide) followed by addition of a triamine crosslinker, in appropriate amount to consume the total amount of the end groups (i.e. amine or anhydride, respectively).

The ability to vary the amount of crosslinking allows the synthesis of crosslinked polyimides and poly(amide-imides) with mechanical properties (i.e. $T_g$) tailored to a specific application or to specific environmental conditions. A generalized method for incorporating a sufficient amount of functionalization in the poly(amic acid)-containing precursor may be based on the desired degree of crosslinking in the resultant polyimide or poly(amic acid). For example, the general method can include selecting the desired multi-functional crosslinking agent (e.g., amine- or anhydride-functionalized) and the desired amount of crosslinking (c mol %), and then preparing the appropriately functionalized poly(amic acid)-containing precursor by employing the excess monomer in an amount of about (100+1.5 c) mol %. The limiting reagent is based on 100 mol %. In one embodiment, the amount of multi-functional crosslinking agent used to crosslink the poly(amic acid) may vary from about 0.3 mol % to about 10 mol %. In another embodiment, the amount of multi-functional crosslinking agent used to crosslink the poly(amic acid) may vary from about 0.5 mol % to about 5 mol %. For example, the multi-functional crosslinking agent concentration about 0.5 mol %, about 1.0 mol %, about 2.0 mol %, or about 5.0 mol %.

Multi-Anhydride Crosslinking Agents

In accordance with an embodiment of the present invention, a multifunctional crosslinking agent is provided that has three or four anhydride functional groups (i.e., tri-anhydride crosslinking agents or tetra-anhydride crosslinking agents, respectively). The multifunctional crosslinking agents may be defined by the general chemical Formula (I): Z—(—Ar—)n -W, wherein Z represents an anhydride functional group that is directly or indirectly bonded to Ar; wherein Ar represents an aryl group that is directly bonded to W; and wherein n is equal to 3 when W is N or P=O, or n is equal to 4 when W is Si or an sp3 hybridized carbon moiety. Accordingly, the tri-anhydride crosslinking agents may be Z—(—Ar—)$_3$N or Z—(—Ar—)$_3$P=O; and the tetra-anhydride crosslinking agents may be Z—(—Ar—)$_4$Si or Z—(—Ar—)$_4$R, where R represents the carbon moiety (e.g., fluorenyl).

In accordance with an aspect of the invention, the aryl group (Ar), which is directly bonded to W through a carbon atom, may be a phenyleneoxy group (—OPh-) that is para- or meta-substituted with respect to oxygen, and thus the agent may be further defined by the general chemical Formula (II):Z—(—OPh-)$_n$-W. In one embodiment, the phenyleneoxy group represents that the benzene ring portion may unsubstituted (i.e., OC$_6$H$_4$); alternatively, the phenyleneoxy group may have substituents (e.g., C$_1$-C$_4$ alkyl groups) around the benzene ring. In one example, where W is P=O, the agent may be further defined by the general chemical Formula (III):Z—(—OPh-)$_3$-P=O. In accordance with another aspect, the aryl group (Ar) may be a phenyleneoxy group (—OPh-) that is para- or meta-substituted with respect to oxygen, and Z may be a phthalic anhydride group that is connected to the phenyleneoxy group through an ether bond. Accordingly, the agent may be further defined by the general chemical Formula (IV) below:

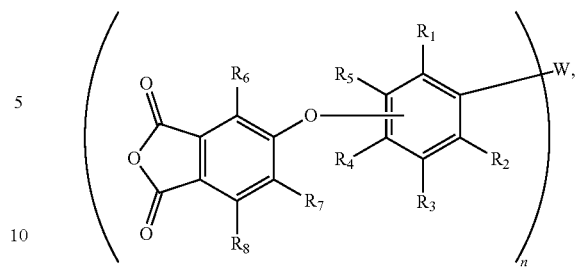

wherein W and n are as defined above, and $R^1$ through $R^8$ are independently selected from H or $C_1$-$C_4$ alkyl. Where W is P=O, these phosphine oxide-based crosslinking agents may be defined by the general chemical Formula (V) below:

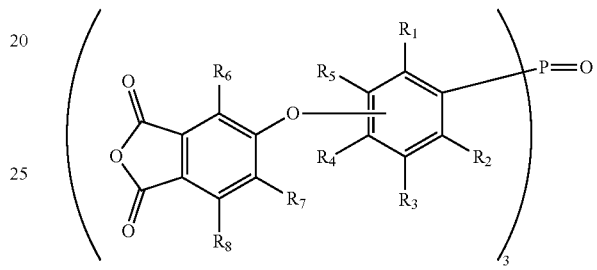

Exemplary phosphine oxide-based crosslinking agents are tris[4-(3,4-dicarboxyphenoxy)phenyl]phosphine oxide tri-anhydride (where $R_1$ to $R_3$ and $R_5$ to $R_8$ are H), and its meta-isomer, which is tris[3-(3,4-dicarboxyphenoxy)phenyl]phosphine oxide tri-anhydride (i.e., where $R_1$ to $R_4$ and $R_6$ to $R_8$ are H).

In accordance with yet another aspect, where W is N, and where the aryl group (Ar) is the phenyleneoxy group (—OPh-), which is para- or meta-substituted with respect to oxygen, a tertiary amine-based crosslinking agent may be defined by the general chemical Formula (VI): (Z— OPh-)$_3$N. In another embodiment, where Z is the phthalic anhydride group that is connected to the phenyleneoxy group through an ether bond, exemplary tertiary amine-based crosslinking agents may be defined by the general chemical Formula (VII) below:

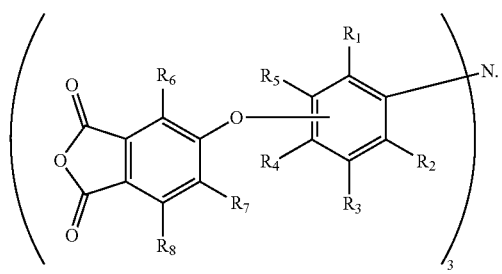

Exemplary tertiary amine-based crosslinking agents are tris[4-(3,4-dicarboxyphenoxy)phenyl]amine tri-anhydride (where $R_1$ to $R_3$ and $R_5$ to $R_8$ are H), and its meta-isomer, which is tris[3-(3,4-dicarboxyphenoxy)phenyl]amine tri-anhydride (i.e., $R_1$ to $R_4$ and $R_6$ to $R_8$ are H).

In accordance with another embodiment, complementary tetra-anhydride crosslinking agents include where W (in Formulas (I), (II), and (IV)) is a carbon moiety, and thus n is 4. Further, exemplary carbon-based tetra-anhydride crosslinking agents 4a, 4b, and 5c are also shown in Table 1. The carbon moiety may include a centralized sp³ hybridized carbon to provide a generally tetrahedral geometry to the agent. For example, agents 4a and 4b include a fluorenyl group, where the $C_9$ carbon of the fluorenyl group is sp³ hybridized.

As also shown in Table 1, the complementary tetra-anhydride crosslinking agents include where W (in Formulas (I), (II), and (IV)) is silicon or an sp³ hybridized carbon, and thus n is 4. Further, exemplary silicon-based (5a and 5b, E=Si) or sp³ hybridized carbon-based (5c and 5d, E=C) tetra-anhydride crosslinking agents are also shown in Table 1 below.

TABLE 1

Exemplary Multi-Anhydride Crosslinking Agents

Tri-anhydride crosslinkers

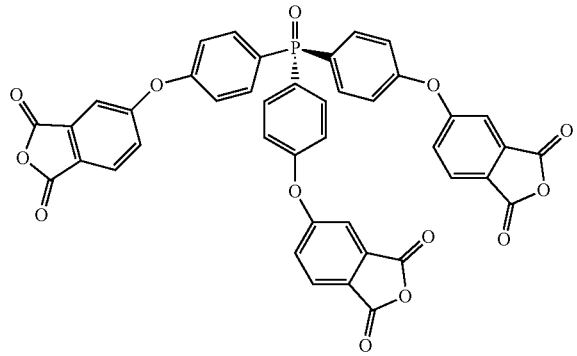

1a

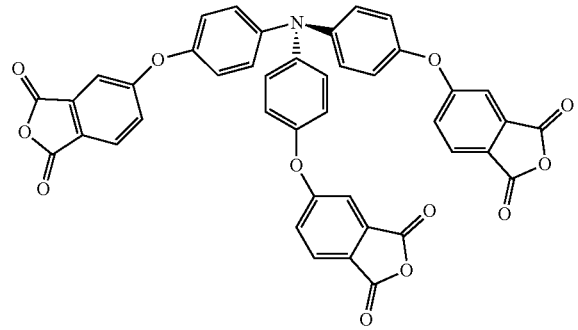

2a

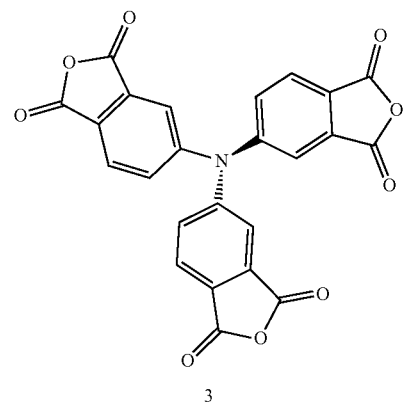

3

TABLE 1-continued
Exemplary Multi-Anhydride Crosslinking Agents
Tetra-anhydride crosslinkers
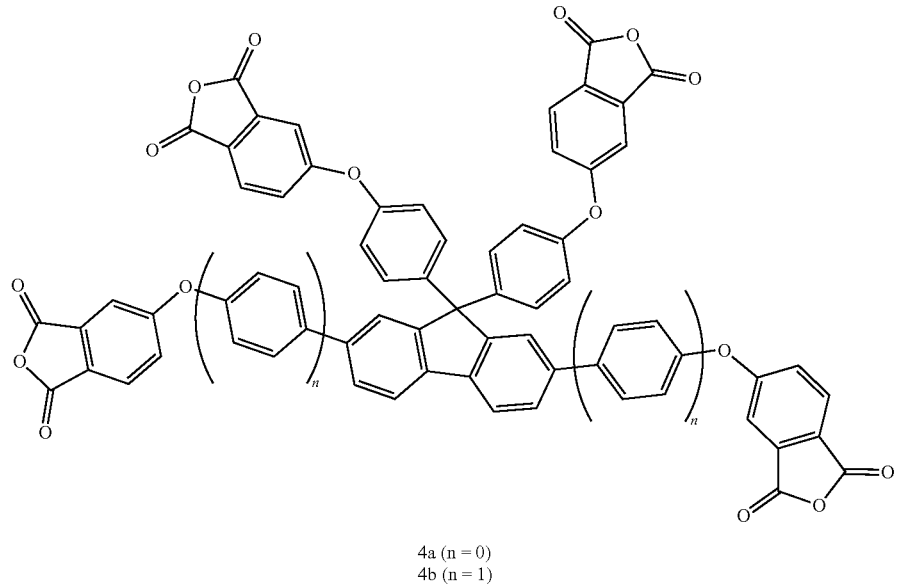
4a (n = 0)
4b (n = 1)
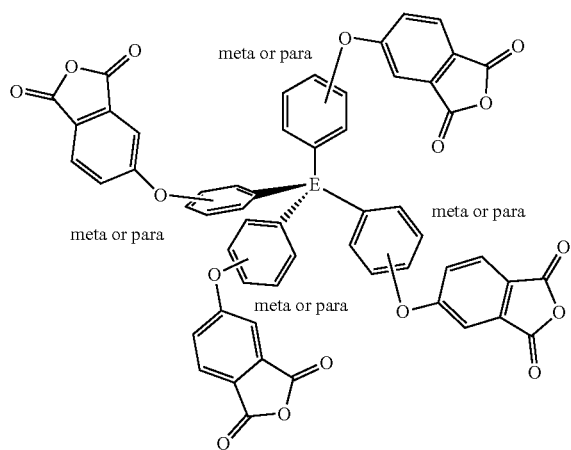
5a (E = Si; all para)
5b (E = Si; all meta)
5c (E = C; para)

In accordance with an embodiment, the crosslinked polyimides obtained with the multi-anhydride crosslinking agents may be defined by the following general chemical Formula (VIII) below:

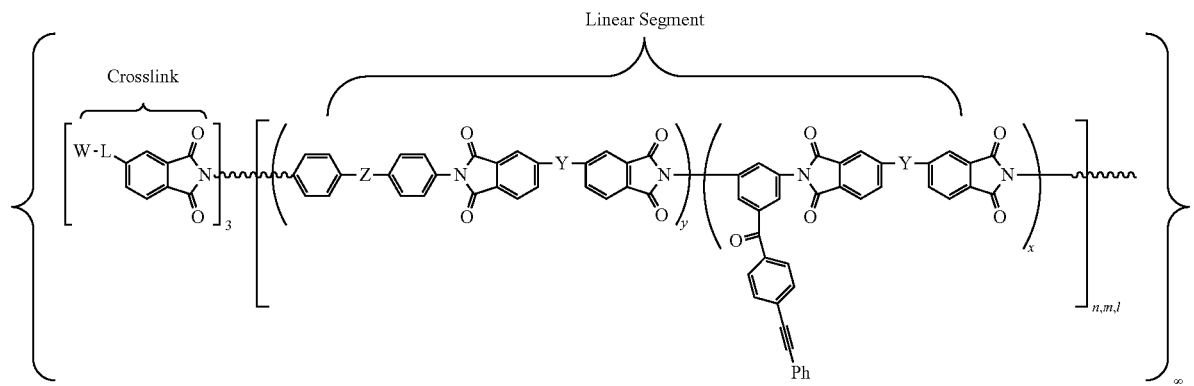

where W may be P=O, N, Si, or a carbon moiety (e.g., fluorenyl); wherein L denotes either a direct covalent bond to W or a linking group (e.g., a phenyleneoxy group) for indirect bonding to W; x, y denote the molar ratio of the linear subunit respectively with or without a PE moiety and x+y=100 mol %; n, m, l denote the degree of polymerization (DP) of each branch of polyimide, which may be of the same or different values, with the DP range of about 3 to about 30. For example, in an embodiment, DP is in a range of about 5 to about 25, or about 10 to about 20. The overall network structure is denoted by the infinity symbol (∞). The linking group Y is one of the following moieties: —C(CF$_3$)$_2$—, —O—, —SO$_2$—, —C(=O)—, —(Ph)C(CF$_3$)—, —OPh-C(CF$_3$)$_2$—OPh-, —OPh-C(CH$_3$)$_2$—OPh-; Z=O, -(pC$_6$H$_4$O)-(pC$_6$H$_4$O)-(pC$_6$H$_4$)—, -(pC$_6$H$_4$O)-(mC$_6$H$_4$O)-(pC$_6$H$_4$)— and -(mC$_6$H$_4$O)-(mC$_6$H$_4$O)-(mC$_6$H$_4$)—.

In accordance with another embodiment, the crosslinked polyimides obtained with the multi-anhydride crosslinking agents may be defined by the following general chemical Formula (IX) below:

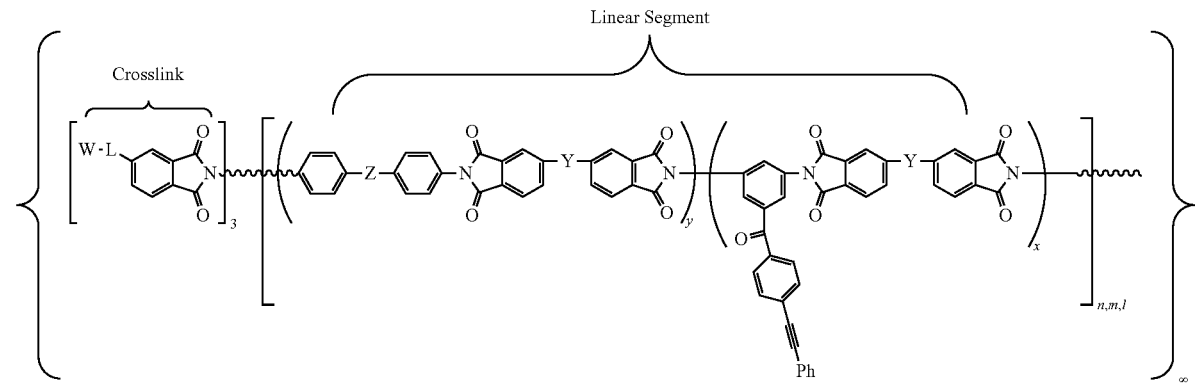

where W may be N or P=O; L, n, m, l, x, y, Y and Z are as defined above.

In accordance with yet another embodiment, the cross-linked polyimides obtained with the multi-anhydride crosslinking agents may be defined by the following general chemical Formula (X) below:

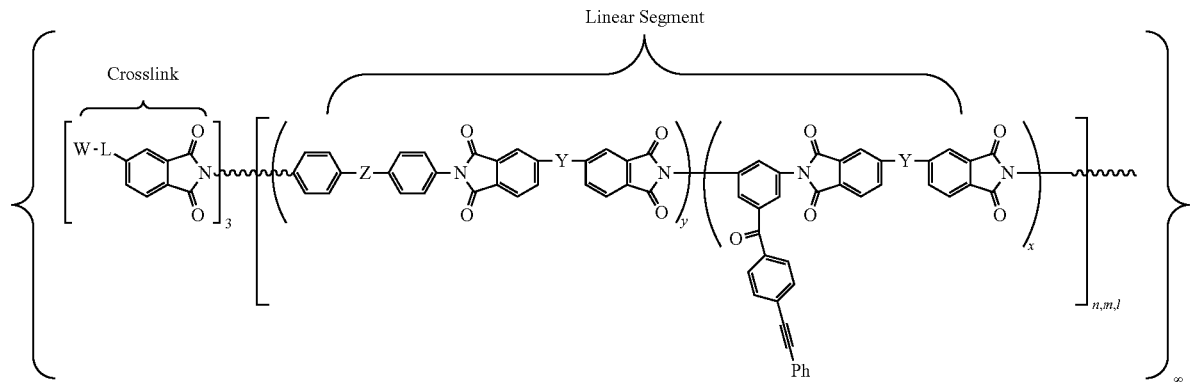

where W is N or benzene-1,3,5-trioxy (1,3,5-$C_6H_3O_3$); and n, m, l, x, y, Y and Z are as defined above.

Multi-Amine Crosslinking Agents:

In accordance with an embodiment of the present invention, a multifunctional crosslinking agent is provided that has three amine functional groups (i.e., tri-amine crosslinking agent). The tri-amine crosslinking agent may be defined by the general chemical Formula (IX): ($H_2N$—Ar—$)_3$—W, wherein Ar represents an aryl group that is directly or indirectly bonded to W; and wherein W may be $CH_3C$ (methylcarbyl); N (trivalent nitrogen); P=O (phosphine oxide); or $BO_3$ (borate). Accordingly, the tri-amine crosslinking agents may be ($H_2N$—Ar—$)_3$—$CCH_3$, ($H_2N$—Ar—$)_3$—N, ($H_2N$—Ar—$)_3$—P=O, or ($H_2N$—Ar—$)_3$—$BO_3$. In an embodiment, the Ar is a biaryl ether, and thus the tri-amine crosslinking agent may be further defined by the general Formula (X): ($H_2N$—Ar'—O—Ar''—$)_3$—W, where Ar' and Ar'' may be similarly or differently substituted, and where the various isomers are further contemplated.

According to yet another embodiment, the tri-amine crosslinking agent is a tri(oxybenzene-amine) crosslinker having the following general Formula below (XI):

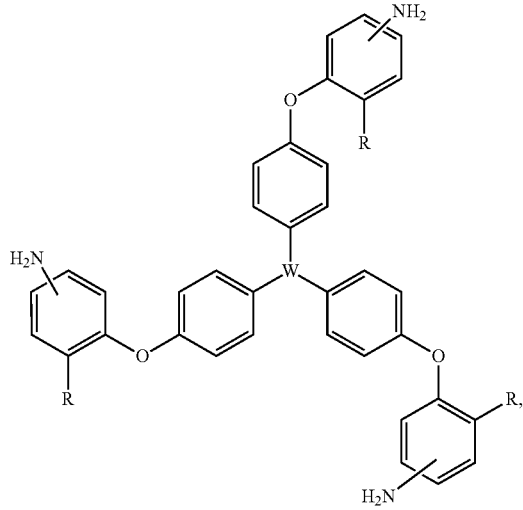

wherein W may be $CH_3C$ (methylcarbyl); N (trivalent nitrogen); P=O (phosphine oxide); or $BO_3$ (borate); R may be H, F, Cl, $CF_3$, or $CH_3$; and the amine groups (—$NH_2$) may be in the meta or para position with respect to oxygen of the biaryl ether bond. Exemplary tri(oxybenzene-amine) crosslinking agents 6a,b; 7a,b; 8a,b; and 9a,b are shown in Table 2 below.

TABLE 2

Exemplary Tri(oxybenzene-amine) Crosslinking Agents

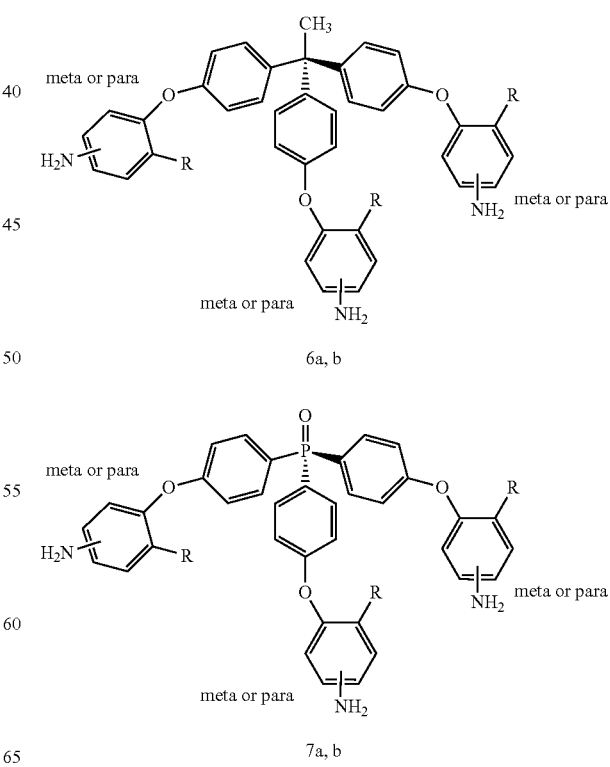

TABLE 2-continued

Exemplary Tri(oxybenzene-amine) Crosslinking Agents 8a, b 9a, b

Exemplary crosslinked aromatic polyimides obtained from the tri(oxybenzene-amine) crosslinking agents (where R═H) have the following general Formula below (XII):

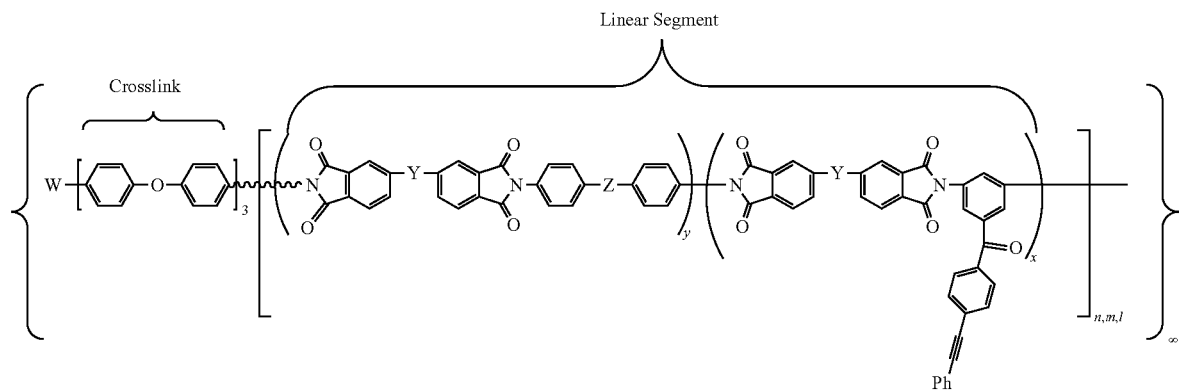

wherein Y is selected from the group consisting of —C(CF$_3$)$_2$, —O—, SO$_2$—, —C═O—, —(Ph)C(CF$_3$)—, —OPh-C(CF$_3$)$_2$—OPh-, —OPh-C(CH$_3$)$_2$-PhO—, —O(1,3-Ph)O— and —O(1,4-Ph)O—; Z═O, -(pC$_6$H$_4$O)-(pC$_6$H$_4$O)-(pC$_6$H$_4$)—, -(pC$_6$H$_4$O)-(mC$_6$H$_4$O)-(pC$_6$H$_4$)— and -(mC$_6$H$_4$O)-(mC$_6$H$_4$O)-(mC$_6$H$_4$)—; x, y denote the molar ratio of the linear subunit respectively with or without a PE moiety and x+y=100 mol %; n, m, and l are degrees of polymerization (DP) of each branch of the crosslinked aromatic polyimide; and the infinity symbol (∞) is used to denote an infinite network structure for a crosslinked polymer.

Similar to the crosslinked polymers obtained using the multi-anhydride crosslinking agents, the degrees of polymerization (DP) of each branch of the crosslinked aromatic polyimide may be the same or different. In one exemplary embodiment, the DPs are the same with respect to one another. In another embodiment, at least one of the DPs is different. In another embodiment, the DP of each branch may be in a range of about 3 to about 110 units. In an alternative embodiment, the DP may be in a range of about 3 to about 30, or about 5 to about 55 units. For example, in another embodiment, DP is in a range of about 5 to about 25, or about 10 to about 20.

The extent and amount of crosslinking in the crosslinked polyimide polymers and films may be altered by varying the concentration of the tri-amine crosslinker (i.e. about 0.5 mol %, about 1.0 mol %, about 2.0 mol %, or about 5.0 mol %). In one embodiment, the tri-amine crosslinker concentration may vary from about 0.3 mol % to about 10 mol %. In another embodiment, the tri-amine crosslinker concentration may be between about 0.5 mol % to about 5 mol %. The ability to vary the amount of crosslinking allows the synthesis of crosslinked polyimides with mechanical properties (i.e. T$_g$) tailored to a specific application or to specific environmental conditions.

EXAMPLES

The following examples and methods are presented as illustrative of the present invention or methods of carrying out the invention, and are not restrictive or limiting of the scope of the invention in any manner.

Example 1

Figure 1A:
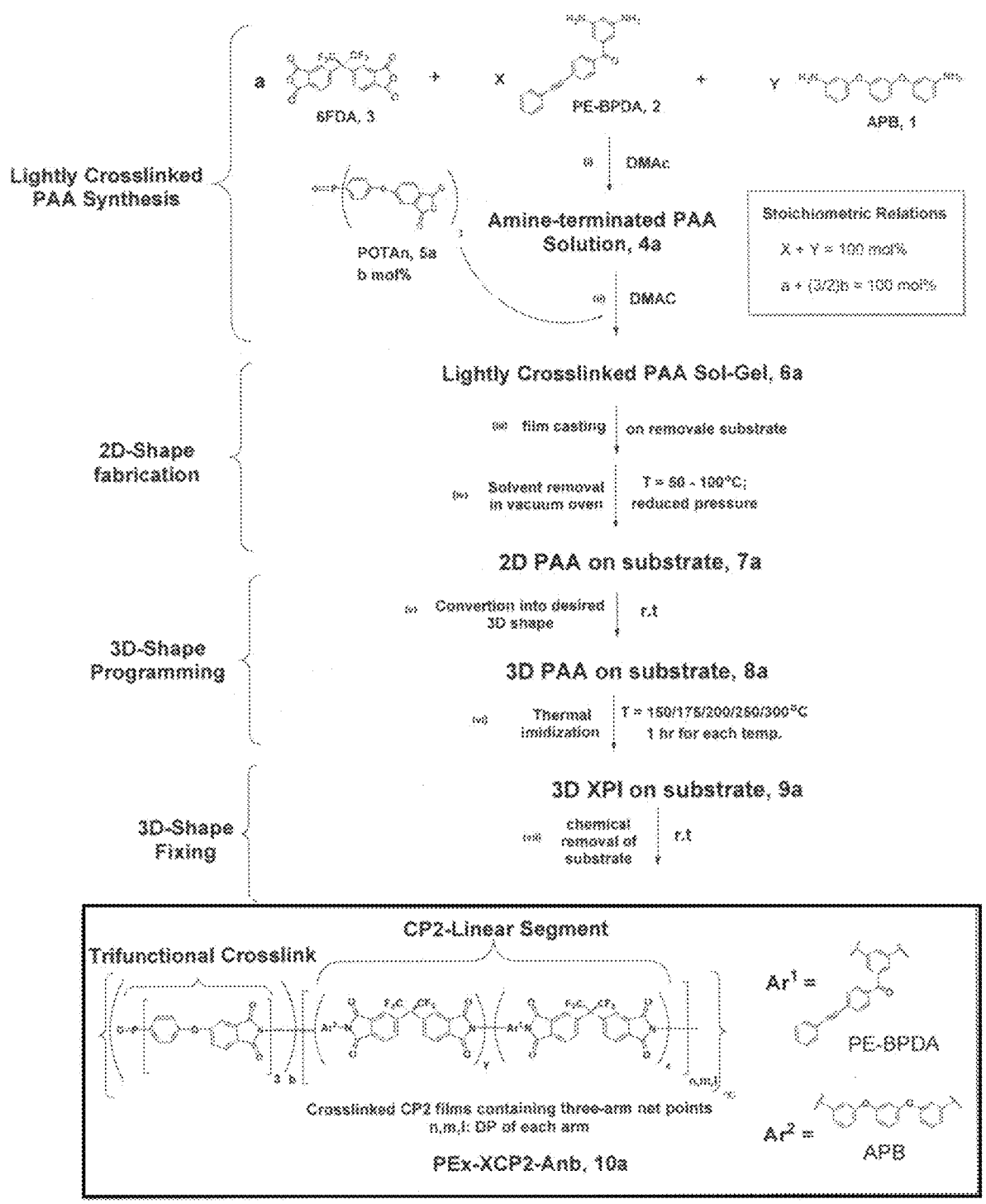
FIG. 1A An exemplary scheme depicts the integrated process that combines the synthesis of lightly crosslinked polyamic acid (PAA), steps (i)-(ii), and fabrication of 3D object comprised of crosslinked polyimide (3D-XPI): 2D (film) and 3D fabrication, steps (iii)-(iv) and steps (v)-(vi), respectively, and removal of supporting substrate, step (vii). This example pertains to generation of amine-terminated PAA that reacts fully with stoichiometric amount of a trianhydride crosslinker (POTAn). The idealized structure of crosslinked polyimides, designated as PEx-XCP2-Anb where "x=mol % of PE-BPDA", X denotes crosslinked and "b=mol % of phosphine-oxide trianhydride", is shown in the box.
Figure 1B:
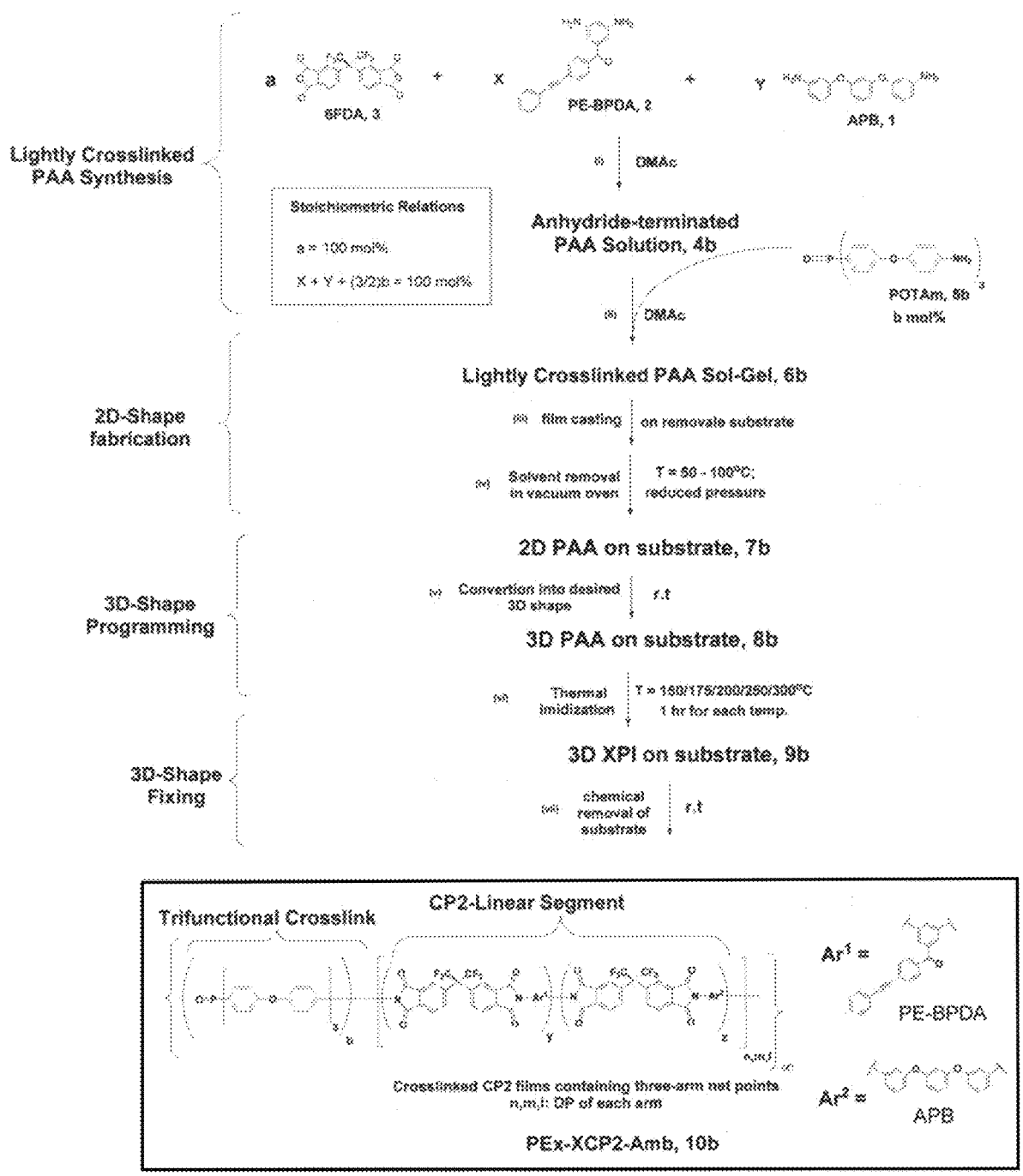
FIG. 1B is an exemplary scheme depicting the integrated process that combines the synthesis of lightly crosslinked polyamic acid (PAA), steps (i)-(ii), and fabrication of 3D object comprised of crosslinked polyimide (3D-XPI): 2D (film) and 3D fabrication, steps (iii)-(iv) and steps (v)-(vi), respectively, and removal of supporting substrate, step (vii). This example pertains to generation of anhydride-terminated PAA that reacts fully with stoichiometric amount of a triamine crosslinker (POTAm). The idealized structure of crosslinked polyimides, designated as PEx-XCP2-Anb where "x=mol % of PE-BPDA", X denotes crosslinked and "b=mol % of phosphine-oxide triamine", is shown in the box.

With reference to FIGS. 1A and 1B, exemplary integrated processing chemistry that is used to generate either tri-anhydride or tri-amine crosslinked polyimide 3D objects from their respective reactive polyamic acid (PAA) solution and crosslinker, i.e either amine-terminated or anhydride-terminated PAA on a supporting 2D substrate (e.g. aluminum surface) are provided. CP2 (LaRC™—CP2, NASA Langley Research Center) is an exemplary fluorinated polyimide derived from 2,2-bis(4-phthalic anhydrido)-1,1,1,3,3,3-hexafluoroisopropane (6FDA) and 1,3-bis(3-aminophenoxy)benzene (APB). The subject polyimide (CP2) is selected to prove the concept because it is a well-known and well-characterized polyimide derived from 2,2-bis(4-phthalic anhydrido)-1,1,1,3,3,3-hexafluoroisopropane (6FDA, a dianhydride monomer) and 1,3-bis(3-aminophenoxy)benzene (APB, a diamine monomer). Briefly, CP2 is a high-performance aerospace-grade polyimide that possesses remarkable properties including, high mechanical toughness, solvent resistance, high glass transition temperature, ultraviolet radiation resistance, low color, low solar absorption, and high thermal and thermo-oxidative stability. CP2 is particularly suitable for long-term survivability in space environments, and has been used to develop lightweight, inflatable structures that serve as Gossamer-like spacecraft, satellites, and solar energy collection/reflection systems. Addition of high-temperature shape-memory capability to CP2 and related polyimides will extend their applications where robust, dynamic properties are required under extremely hot conditions. Referring to FIG. 1A, the origami-inspired fabrication process is based on the processing chemistry of poly(amic acid)/polyimide using either a triphenylphosphine-based trianhydride (5a) or triamine (5b) as a crosslinker. In this process, when the trianhydride crosslinker (x mol %) is used (i.e. process A), the co-monomers, APB (a diamine, 1), PE-BPDA (a phenylethynyl-containing diamine, 2) and 6FDA (a dianhydride, 3) were dissolved under nitrogen atmosphere in a polar aprotic solvent such as N,N-dimethylacetamide (DMAc) (5 wt % polymer concentration) at room temperature for 24 h with excess APB (i.e. 1.5× mol % excess where x=mol % of trianhydride crosslinker used) for the preparation of oligo (amic acid) (PAA oligomers, 4a) with reactive amine function as end groups. Subsequently, the trianhydride crosslinker (e.g. phosphine oxide trianhydride, 5a; x mol %) was added to the solution of PAA oligomers with a reaction stoichiometric ratio of the amino group to the terminal acid anhydride. After the crosslinker had completely dissolved, the resulting PAA sol-gel (6a) was immediately used in the fabrication of origami (3D) object as described in Example 4. Alternatively in the process B as depicted in FIG. 1B, when a triamine crosslinker (5b) is used, anhydride-terminated PAA (4b) solution is generated from the initial polymerization mixture of excess dianhydride monomer and the two diamine monomers, followed by addition of stoichiometrically balanced amount of the triamine crosslinker to result in the modified PAA sol-gel (6b) for immediate used in the fabrication of an origami object as described in Example 4.

Example 2

Figure 2A:
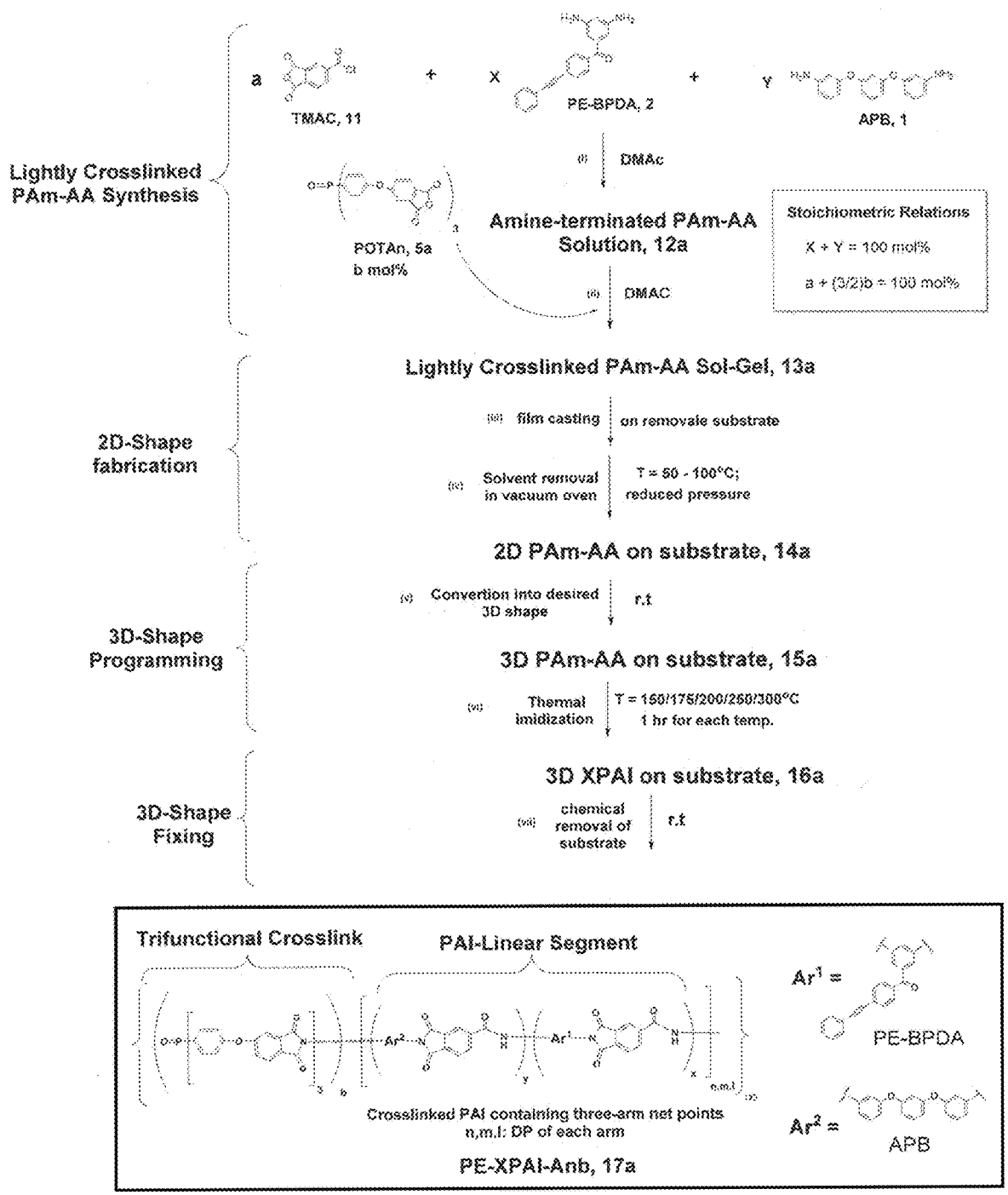
FIG. 2A is an exemplary scheme depicts the integrated process that combines the synthesis of lightly crosslinked poly(amide-amic acid) (PAm-AA), steps (i)-(ii), and fabrication of 3D object comprised of crosslinked poly(amide-imide) (3D-XPAI): 2D (film) and 3D object fabrication, steps (iii)-(iv) and steps (v)-(vi), respectively, and removal of supporting substrate, step (vii). This example pertains to generation of amine-terminated PAm-AA that reacts fully with stoichiometric amount of a trianhydride crosslinker (POTAn). The idealized structure of crosslinked polyimides, designated as PEx-XPAI-Anb where "x=mol % of PE-BPDA", X denotes crosslinked and "b=mol % of phosphine-oxide trianhydride", is shown in the box.
Figure 2B:
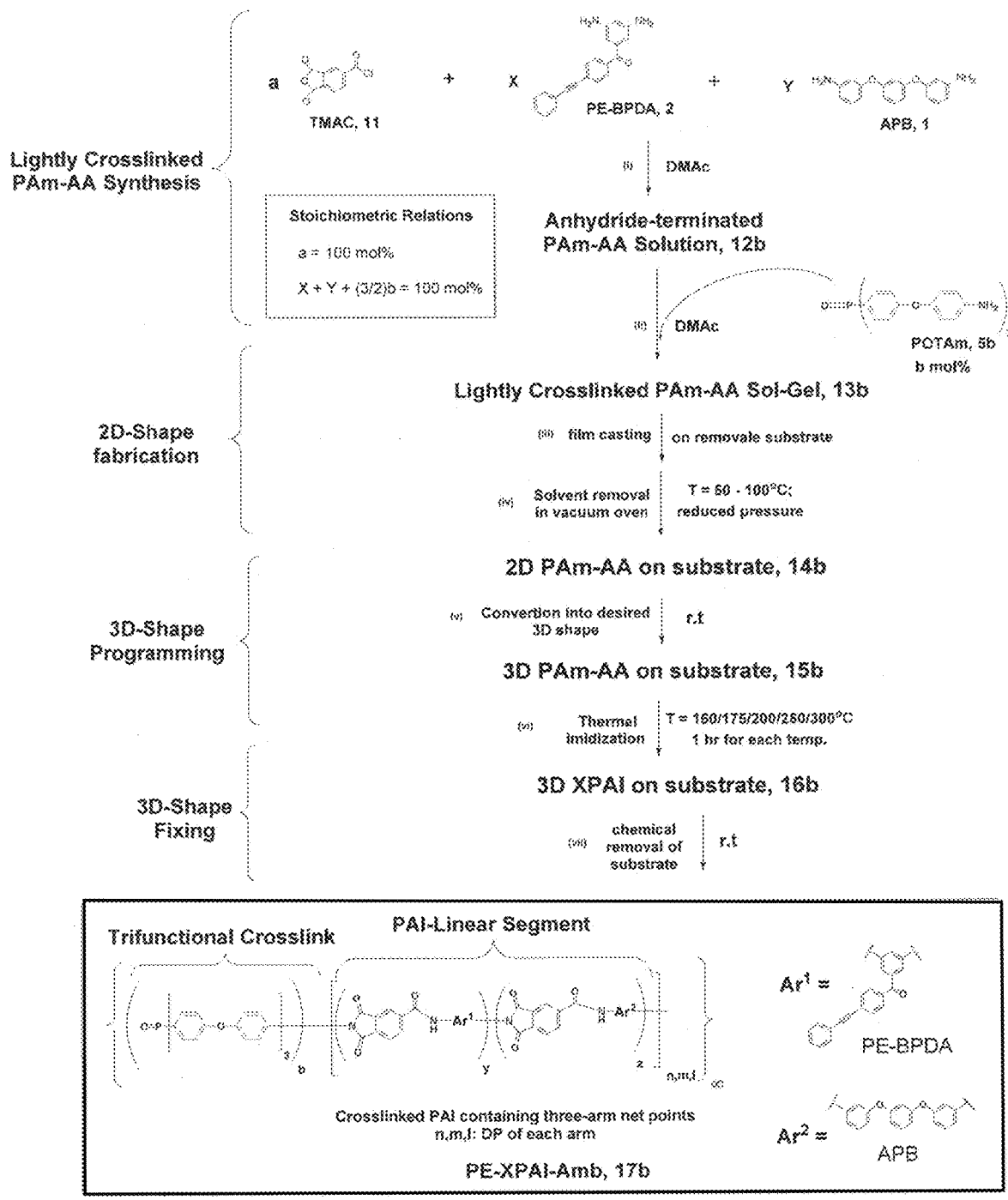
FIG. 2B is an exemplary scheme depicting the integrated process that combines the synthesis of lightly crosslinked poly(amide-amic acid) (PAm-AA), steps (i)-(ii), and fabrication of 3D object comprised of crosslinked poly(amide-imide) (3D-XPAI): 2D (film) and 3D object fabrication, steps (iii)-(iv) and steps (v)-(vi), respectively, and removal of supporting substrate, step (vii). This example pertains to generation of amine-terminated PAm-AA that reacts fully with stoichiometric amount of a trianhydride crosslinker (POTAn). The idealized structure of crosslinked polyimides, designated as PEx-XPAI-Anb where "x=mol % of PE-BPDA", X denotes crosslinked and "b=mol % of phosphine-oxide trianhydride", is shown in the box.

FIGS. 2A and 2B illustrate the origami-inspired fabrication process that is based on the processing chemistry of poly(amide-amic acid)/poly(amide-imide) (Pam-AA/PAI) using either a triphenylphosphine-based trianhydride (5a) or triamine (5b) as a crosslinker, respectively. When the trianhydride crosslinker (x mol %) is used (i.e. process A'), the co-monomers, APB (a diamine, 1), PE-BPDA (a phenylethynyl-containing diamine, 2) and TMAC (trimellitic anhydride-chloride (an anhydride-acid-chloride monomer, 11) were dissolved under nitrogen atmosphere in a polar aprotic solvent such as N,N-dimethylacetamide (DMAc) (5 wt % polymer concentration) at room temperature for 24 h with excess APB (i.e. 1.5 x mol % excess where x=mol % of trianhydride crosslinker used) for the preparation of oligo (amide-amic acid) (PAm-AA oligomers, 12a) with reactive amine function as end groups. Subsequently, the trianhydride crosslinker (e.g. phosphine oxide trianhydride, 5a; x mol %) was added to the solution of PAm-AA oligomers with a reaction stoichiometric ratio of the amino group to the terminal acid anhydride. After the crosslinker had completely dissolved, the resulting PAm-AA sol-gel (13a) was immediately used in the fabrication of origami (3D) object as described in Example 4. Alternatively in the process B' as depicted in FIG. 2B, when a triamine crosslinker (5b) is used, anhydride-terminated PAm-AA (12b) solution is generated from the initial polymerization mixture of excess anhydride-acid chloride monomer (TMAC) and the two diamine monomers, followed by addition of stoichiometrically balanced amount of the triamine crosslinker to result in the modified PAm-AA sol-gel (13b) for immediate used in the fabrication of an origami object as described in Example 4.

Example 3

FIG. 3 illustrate the origami-inspired fabrication process for the crosslinked copolymer compositions of a polyimide and a poly(amide-imide) that are derived from blending of poly(amide-amic acid)/poly(amide-imide) (PAm-AA/PAI) using either a triphenylphosphine-based trianhydride (5a) or triamine (5b) as a crosslinker, respectively. When the trianhydride crosslinker (x mol %) is used (i.e. process A"), the amine-terminated PAA solution (4a) from Example 1 (FIG. 1A) and the amine-terminated PAm-AA solution (12a) from Example 2 (FIG. 2A) are blended, followed by the addition of appropriate amount of the trianhydride crosslinkers (2b mol % based on the stoichiometry depicted in FIGS. 1A and 2A). After the crosslinker had completely dissolved, the resulting blended PAA/PAm-AA sol-gel (18a) was immediately used in the fabrication of origami (3D) object as described in Example 4. Alternatively in the process B", when a triamine crosslinker (5b) is used, anhydride-terminated PAA solution (4b) from Example 1 (FIG. 2B) and PAm-AA (12b) solution from Example 2 (FIG. 2B) are mixed, followed by addition of stoichiometrically balanced amount of the triamine crosslinker to result in the modified PAA/PAm-AA sol-gel (18b) for immediate used in the fabrication of an origami object as described in Example 4.

Example 4

Referring to FIG. 4, a flow chart for constructing a hollow shape memory polyimide cube is provided. The first step of the fabrication is to prepare the modified polymer intermediate solution (sol-gel), such as PAA (4a or 4b), PAm-AA (12a or 12b) and PAA/PAm-AA (18a or 18b) containing the requisite amount of an appropriate crosslinker (5a or 5b) as described above and shown in FIGS. 1A, 1B, 2A, 2B and 3. The second step entails pouring the viscous sol-gel of modified polymer intermediate into a substrate (e.g. an aluminum dish). The third step pertains to evaporation of the solvent under reduced pressure and in temperature range where none or partial curing of PAA is taking place. For example, the substrate coated with the viscous modified polymer intermediate sol-gel may be heated to a temperature from about 50° C. to about 100° C. under reduced pressure, such that only partial imidization (cure) of the modified polymer intermediate, driven by cyclo-dehydration reaction of its amic acid moieties, is taking place. However use of lower temperatures (e.g., room temperature to about 50° C.) and lower pressures (e.g., less than about 200 torr or less than about 100 torr) may minimize or prevent excessive curing. Once the laminated substrate (i.e 7a, 7b, 14a, 14b, 19a, 19b in FIGS. 1A, 1B, 2A, 2B and 3) is stable, the next step involves drawing the origami folding pattern on the aluminum side of the substrate and cut out the pattern with a pair of scissors. Manual folding sequence of the two-dimensional configuration of the origami object (8a, 8b, 15a, 15b, 20a, and 20b in FIGS. 1A, 1B, 2A, 2B and 3) at room temperature is then performed so that the aluminum substrate is on the outside to form a three-dimensional form. Following an imidization process, where a curing schedule for crosslinked polymers (i.e. 9a, 9b, 16a, 16b, 21a, and 21b in FIGS. 1A, 1B, 2A, 2B and 3) is performed (e.g., sequential heating at about 150° C., about 175° C., about 200° C., about 250° C., and/or about 300° C.), the next step involves removal of the substrate. For example aluminum can be dissolved easily in aqueous HCl. The resulting crosslinked polymer hollow cube (i.e. 10a, 10b, 17a, 17b, 22a, and 22b in FIGS. 1A, 1B, 2A, 2B and 3) is shown in the top photo of FIG. 4.

Example 5

Qualitative shape-memory effect (SME) has been demonstrated by stretching the PEx-XCP2-Amb (10b) polymer films in a 240° C. oil bath, and "freezing" the temporary shape at ambient temperature. The results indicate that both PE-XCP2-25, PE-XCP2-50, 2PE-XCP2-40 have retained similar SM effect as XCP2 (with 5 mol % POTAm crosslinker and 0 mol % PE-BPDA) at glass-transition temperature below the onset temperature of PE crosslinking (~290-300° C.). In addition, excellent SME could be demonstrated by having the 3D folded objects fabricated with PEx-XCP2-Amb (x=PE mol %; b=mol % POTAm) placed in an oil bath at temperature range of 240° C., they can be readily unfolded and fixed in the 2D shapes under stress when cooled quickly to room.

Example 6

Referring to FIG. 5, the two-dimensional shape memory behaviors of a PE-containing, POTAm-crosslinked copolyimide, PE25-XCP2-Am5; (25 mol % PE; 5 mol % POTAm) at 250° C. (above the initial glass transition temperatures (~224° C.) but ~50° C. below the typical onset temperature observed for the thermal curing of phenylethynyl thermosetting polymers) was used as the triggering temperature were evaluated by stress-strain-temperature (SST) cycles on a dynamic mechanical analyzer (DMA). Both shape memory fixity and recovery of PE25-XCP2-Am5 were calculated based on the DMA tests. Shape fixity of 100% implies a perfect retention of the programmed strain after the external stress has been released, and reflects the efficacy of the first two steps of the shape memory process. Shape recovery of 100% implies perfect recovery of the permanent shape after the shape memory cycle. The films were subjected to 20 SST cycles and the outcome indicates that the values for the shape fixity and recovery are both >99%.

Example 7

Referring to FIG. 6, the two-dimensional shape memory behavior of a PE-containing, POTAm-crosslinked copolyimide, PE25-XCP2-Am5; (25 mol % PE; 5 mol % POTAm) was evaluated by stress-strain-temperature (SST) cycles on a dynamic mechanical analyzer (DMA) at 340° C., well above both the initial glass transition temperatures (~224° C.) and the typical onset temperature observed for the curing of phenylethynyl thermosetting polymers (~300° C.). Both shape memory fixity and recovery of PE25-XCP2-25 were calculated based on the DMA tests. Shape fixity of 100% implies a perfect retention of the programmed strain after the external stress has been released, and reflects the efficacy of the first two steps of the shape memory process. Shape recovery of 100% implies perfect recovery of the permanent shape after the shape memory cycle. The films were subjected to 11 testing cycles. As shown in FIG. 6, at 340° C. at which PE crosslinking chemistry is taking place, the shape memory is apparently degrading with losing its elasticity at this temperature as the $T_g$ and modulus are progressively increasing. In other words, the deployed origami object is becoming less and less elastomeric and more and more dimensionally stable thermoplastic object as long as the temperature of the hot environment does not exceed the $T_g$ enhanced by the crosslinking chemistry of phenylethynyl pendants.

Example 8

Referring to FIGS. 7 and 8, to be a high temperature deployable, an important and unique feature of this shape-memory platform is to provide the as-fabricated, 3D shape of the object to be permanently stable at surrounding temperature ($T_{surr}$) near or above the initial glass-transition, up to $T_{g,ini}$+100° C., with proper structural tuning in relation to the initial $T_{g,ini}$. This capability is absent in the traditional shape-memory polymers. Similar to traditional thermally shape-memorizing polymers, a 2D shape or other 3D shapes can be temporarily fabricated when the initially fabricated 3D object is heated to temperatures in the glass transition region and rapidly cooled to room temperature with the desired shape held under stress. The temporary 2D or 3D shape of the fabricated polymer object would spontaneously return to the original 3D shape at $T_{surr}$~$T_{g,ini}$. The original 3D shape of the object persists for a long time at any temperature near the polymer glass-transition temperature but well below the new glass-transition ($T_{g,cured}$) and decomposition temperatures. More importantly, the degree of dimensional stability increases with time as the imbedded phenylethynyl pendants starts and continues to crosslink resulting in the concomitant increase in $T_{g,cured}$ and modulus. This novel feature has been demonstrated by dynamic mechanical analysis (DMA) experiments on PE25-XCP2-Am5 and PE50-XCP2-Am5 (see FIGS. 7 and 8, respectively). The initial set of DMA experiments that involved just the repetitive heat-scanning of both samples showed that indeed the $T_g$ and the storage modulus plateau after glass transition were progressively increasing with apparently an increase in the degree of crosslinking. However, as exemplified by the DMA results of PE25-XCP2-Am5, (FIG. 7) several points are noteworthy: (a) PE-BPDA has imparted a considerate amount of combined flexibility via meta (1,3-phenylene) linkage and bulkiness (PE pendant), leading to not only having initial storage modulus (~1.1 GPa) dramatically less than that of XCP2 (typically ~3.0-3.6 GPa; see FIG. 8), a significant and continuous decrease in storage modulus (FIG. 7; $1^{st}$ heating scan; ~1.1 GPa to ~0.68 GPa) between 25-200° C.; (b) the initial E' after PE crosslinking was increased by ~46% (from ~1.1 GPa to ~1.46 GPa) and remain relatively constant in the pre-$T_g$ temperature region; (c) a small but significant increase in post-$T_g$ modulus because of its progressive trend.

Example 9

Referring to FIG. 8, after the crosslinking capacity has been double as in the case of PE50-XCP2-Am5 (50 mol % PE; 5 mol % POTAm), $T_g$ is greatly increased from 253° C. to 322° C. after 24 hr at 300° C. and the modulus at 300° C. is increased from less than 10 MPa (before having any occurrence of PE crosslinking) to 750 MPa (with high degree of PE crosslinking). The overall result demonstrates the concept of programmed enhancement in Tg and modulus via harvesting thermal energy from the surroundings.

Example 10

Preparation of phenylethynyl-containing diamine monomer, 3,5-Diamino-4'-phenylethynylbenzophenone (DPEB) was achieved via a three-step synthesis. The first step involved a Friedel—Crafts acylation of bromobenzene with 3,5-dinitrobenzoyl chloride. Pure 3,5-dinitro-4'-bromobenzophenone was obtained in 68% yield after recrystallization. This compound was subsequently reacted with phenylacetylene using a palladium catalyst to afford 3,5-dinitro-4'-phenylethynylbenzophenone in near 75% yield. Reduction to the diamine was accomplished in approx. 85% yield using stannous chloride.

(a) 3,5-Dinitro-4'-bromobenzophenone. To a dried three-necked 1500 mL round-bottomed flask equipped with a nitrogen inlet, thermometer, mechanical stirrer, reflux condenser, and acid trap were charged 3,5-dinitrobenzoyl chloride (49.5 g, 0.215 mol) and bromobenzene (930 mL). Anhydrous aluminum chloride (36.7 g, 0.275 mol) was added as a powder in several portions over a 40 min period at ambient temperature. Once the addition of aluminum chloride was complete, the temperature was increased to 65° C. and maintained for 24 h. The solution was cooled to ambient temperature and added to a rapidly stirred acidic solution (250 ml of hydrochloric acid and 300 ml of distilled water/ice). A yellow tacky solid separated from solution and was recovered by vacuum filtration. The tacky solid was washed with methanol, recovered by vacuum filtration and dried at 100° C. under vacuum overnight to a yellow solid. The crude solid was recrystallized from toluene to afford 51.4 g (68%) of a yellow crystalline solid, m.p. 178.5-179.2° C. (Lit. 179° C., DSC). $^1$H-NMR (DMSO-$d_6$, δ in ppm): 7.76-7.83 (m, 4H, Ar—H), 8.77 (d, 4H, Ar—H), 9.03-9.04 (t, 1H, Ar—H). $^{13}$C-NMR (DMSO-$d_6$, δ in ppm): 191.13, 148.07, 139.35, 134.26, 132.00, 129.94, 129.31, 128.62, 128.17.

(b) 3,5-Dinitro-4'-phenylethynylbenzophenone. To a three-necked 1000 mL round-bottomed flask equipped with a nitrogen inlet, thermometer, mechanical stirrer, and condenser were charged 3,5-dinitro-4'-bromobenzophenone (45.0 g, 0.128 mol), triethylamine (450 mL), cuprous iodide (0.24 g, 1.26 mmol), triphenylphosphine (1.50 g, 5.72 mmol), bis(triphenylphosphine)palladium dichloride (0.30 g, 0.4274 mmol) and phenylacetylene (13.5 g, 0.132 mol). The temperature was increased to 85° C. and maintained for 12 h. After 2 h the reaction contained a precipitate and was very thick making stirring difficult. The mixture was cooled to ambient temperature and the crude solid recovered by vacuum filtration. The solid was washed successively in triethylamine, acidic water, distilled water and dried at 105° C. in a vacuum oven for 24 h to afford a dark brown powder. Recrystallization from toluene afforded a first crop of yellow/orange crystals (29.9 g, 63%). A second crop of crystals (6.0 g) was obtained after reducing the volume of the filtrate and allowing the solution to cool, m.p. 187.7-188.8° C. (Lit. 188° C., DSC). Final yield was 35.9 g (75%). $^1$H-NMR (DMSO-$d_6$, δ in ppm): 7.46-7.49 (m, 3H, Ar—H), 7.61-7.63 (t, 2H, Ar—H), 7.78-7.80 (d, 2H, Ar—H), 7.91-7.93 (d, 2H, Ar—H), 8.80-8.81 (d, 2H, Ar—H), 9.05-9.06 (t, 1H, Ar—H).

(c) 3,5-Diamino-4'-phenylethynylbenzophenone (PE-BPDA). To a three-necked 500 mL round-bottomed flask equipped with a magnetic stirrer, nitrogen inlet, thermometer and additional funnel were charged 3,5-dinitro-4'-phenylethynylbenzophenone (7.0 g, 18.8 mmol) and 1,4-dioxane (170 ml). The orange solution was cooled to approx. 10° C. to 15° C. in an ice bath. A cooled solution (10° C.) of stannous chloride dihydrate (29.0 g, 129 mmol) in concentrated hydrochloric acid (300 ml) was added dropwise while maintaining the temperature between 10 and 20° C. After the addition, the ice bath was removed and the reaction mixture allowed to warm to room temperature. The mixture was stirred at room temperature for 4 h. During this time the product precipitated from solution. The solid was collected, placed in distilled water and neutralized with aqueous ammonium hydroxide. The crude material was collected by filtration, washed in water and dried at 65° C. overnight in an oven to afford 5.9 g (98%) of a crude solid. The crude product was recrystallized from toluene to afford 5.0 g (85%) of a yellow powder, m.p. 155.2-156.8 (Lit. 156° C., DSC). $^1$H-NMR (DMSO-$d_6$, δ in ppm): 5.04 (s, 4H, NH$_2$), 6.07 (s, 1H, Ar—H), 6.15 (s, 2H, Ar—H), 7.44-7.45 (m, 3H, Ar—H), 7.58-7.60 (t, 2H, Ar—H), 7.61-7.72 (m, 4H, Ar—H). $^{13}$C-NMR (DMSO-$d_6$, δ in ppm): 13C NMR (101 MHz, DMSO) δ 196.10, 149.30, 137.97, 137.81, 131.54, 131.16, 129.58, 129.22, 128.83, 125.67, 121.82, 104.33, 103.43, 91.75, 88.66.

Example 11. Synthesis of Phosphine-Oxide Triamine (a) The following is an exemplary procedure for the synthesis of tris(4-methoxyphenyl)phosphine oxide (TMPO). Into a 100 mL three-necked flask equipped with a magnetic stir bar and nitrogen inlet and outlet were placed tris(4-methoxyphenyl)phosphine (TMP) (3.0 g, 8.5 mmol) and acetone (30 mL). A mixture of water (2 mL) and H$_2$O$_2$ (35%, 1 mL, 9 mmol) was added slowly. After the mixture had been stirred at room temperature for 1 hour, the acetone was evaporated, and methylene chloride (50 mL) was added. The organic phase was washed with a saturated NaCl solution (35 mL) three times with the aid of a separatory funnel. The organic layer was then dried over anhydrous sodium sulfate. Finally, the solvent was removed via rotary evaporation to afford 3.0 g (95%) of a white solid, m.p. 144.7-145.4° C. MS (m/e): 368 (M$^+$). Anal. Calcd. for C$_{21}$H$_{21}$O$_4$P:C, 68.47%; H, 5.75%; P, 8.41%. Found: C, 68.42%; H, 5.72%; P, 8.11%. FT-IR (KBr, cm$^{-1}$): 3068, 3026, 2959, 2837, 1597, 1569, 1503, 1468, 1289, 1254, 1179, 1121, 1019, 803, 671, 543. $^1$H-NMR (CDCl$_3$, δ in ppm): 3.84 (s, 6H, CH$_3$), 6.94-6.97 (dd, 6H, Ar—H), 7.54-7.60 (dd, 6H, Ar—H). 13C-NMR (DMSO-$d_6$, δ in ppm): 55.29, 114.08, 114.21, 124.19, 125.28, 133.21, 133.32, 161.79, 161.82.

(b) The following is an exemplary procedure for the synthesis of tris(4-hydroxyphenyl)phosphine oxide (THPO) via demethylation of TMPO. Into a 500 mL three-necked flask equipped with a magnetic stir bar and nitrogen inlet and outlet were placed TMPO (25.0 g, 67.9 mmol) and pyridine hydrochloride (250 g) at 210° C. for 2 hours. The light brown solution was poured into water while it was still hot. The white precipitate was collected and recrystallized from ethyl acetate to afford 21.0 g (95%) of white crystals, m.p. 274.8-276.8° C. MS (m/e): 326 (M$^+$). FT-IR (KBr, cm$^{-1}$): 3380, 1601, 1581, 1505, 1436, 1278, 1175, 1119, 1068, 831, 677, 537. 1H-NMR (DMSO-$d_6$, δ in ppm): 6.86-6.89 (dd, 6H, Ar—H), 7.32-7.38 (dd, 6H, Ar—H), 10.14 (s, 3H, OH). $^{13}$C-NMR (DMSO-$d_6$, δ in ppm): 115.32, 115.45, 122.59, 123.69, 133.29, 133.40, 160.28, 160.30.

(c) The following is an exemplary procedure for the synthesis of tris[(4-nitrophenoxy)phenyl]phosphine oxide (TNPO). Into a 250 mL three-necked flask equipped with a magnetic stir bar and nitrogen inlet and outlet were placed THPO (7.52 g, 20.0 mmol), 1-fluoro-4-nitrobenzene (II) (9.32 g, 66.0 mmol), potassium carbonate (9.14 g, 66.0 mmol), and DMF (100 mL) at 100° C. for 48 hours. The mixture was allowed to cool to room temperature and filtered. The filtrate was poured into water, and the precipitate was extracted with ethyl acetate (300 mL) three times with the aid of a separatory funnel. The combined organic extract was concentrated under vacuum, and 13.3 g (97%) of yellow crystals that were formed during the concentrating process was collected by filtration, m.p. 205.0-206.6° C. MS (m/e): 689 (M+). FT-IR (KBr, cm$^{-1}$): 3071, 1612, 1585, 1523, 1487, 1345, 1242, 1176, 1116, 879, 866, 831, 788, 696, 556. 1H-NMR (DMSO-d$_6$, δ in ppm): 7.27-7.31 (d, 6H, Ar—H), 7.35-7.37 (d, 6H, Ar—H), 7.75-7.80 (m, 6H, Ar—H), 8.27-8.31 (d, 6H, Ar—H). 13C-NMR (DMSO-d$_6$, δ in ppm): 118.84, 119.82, 119.94, 126.22, 128.18, 129.23, 134.09, 134.20, 143.09, 157.93, 157.96, 161.29.

(d) The following is an exemplary procedure for the synthesis of another exemplary triamine crosslinker tris[(4-aminophenoxy)phenyl]phosphine oxide (TAPO) having the general structure A where W is P=O (IUPAC name 4,4',4''-(4,4',4''-phosphinetriyltris(benzene-4,1-diyl)tris(oxy))trianiline) by reduction of TNPO via catalytic hydrogenation as depicted in FIG. 4. TNPO (8.0 g, 11.6 mmol), DMF (120 mL), and 5% palladium on activated carbon (0.50 g) were added to a hydrogenation bottle. The bottle was secured on a Parr hydrogenation apparatus, flushed three times with hydrogen, and then pressurized to 60 psi. After the mixture had been agitated at room temperature for 24 hours under hydrogen pressure of 60 psi, it was filtered through a cake of Celite. The filter cake was washed with DMF. The filtrate was then poured into water to precipitate a white solid that was subsequently recrystallized from ethanol/water to afford 6.41 g (98%) of white crystal, m.p. 211.1-211.5° C. MS (m/e): 559 (M+). Anal. Calcd. for C36H30N3O4P:C, 72.11%; H, 5.04%; N, 7.01%. Found: C, 72.01%; H, 4.97%; N, 6.91%. FT-IR (KBr, cm$^{-1}$): 3437, 3328, 3210, 3042, 1592, 1507, 1493, 1242, 1197, 1165, 1117, 871, 830, 671, 577. 1H-NMR (DMSO-d 6, δ in ppm): 5.06 (s, 6H, NH$_2$), 6.59-6.62 (d, 6H, Ar—H), 6.79-6.81 (d, 6H, Ar—H), 6.94-6.96 (d, 6H, Ar—H), 7.48-7.53 (d, 6H, Ar—H). 13C-NMR (DMSO-d$_6$, δ in ppm): 114.85, 115.89, 116.01, 121.34, 125.06, 126.13, 133.40, 133.51, 144.11, 146.13, 162.89, 161.92.

Example 12 Phosphine-Oxide Trianhydride

The synthesis of an isomer of triphenylphosphine oxide trianhydride is accomplished in 5-steps starting from commercially available tris(4-methoxyphenyl)phosphine oxide and experimental details are provided as Examples. Briefly, tris(4-methoxyphenyl)phosphine was oxidized to tris(4-methoxyphenyl)phosphine oxide. In a previously reported work, BBr$_3$ was used to demethylate compound 13. However, we found demethylation with pyridine hydrochloride above its melting point was more effective and cleaner. Nucleophilic substitution reaction of the resulting tris(4-hydroxyphenyl)phosphine oxide with 4-nitrphthalonitrile after deprotonation in situ by potassium carbonate) in DMF afforded the corresponding tris(ether-dinitrile) compound, namely tris[4-(3,4-dicyanophenoxy)phenyl]phosphine oxide, which, upon subsequent alkaline hydrolysis was converted to the corresponding tris(ether diacid), which was then cyclodehydrated to produce the desired trianhydride monomer.

(a) Tris(4-methoxyphenyl)phosphine Oxide. Into a 100 mL three-necked flask equipped with a magnetic stir bar and nitrogen inlet and outlet were placed tris(4-methoxyphenyl) phosphine (3.0 g, 8.5 mmol) and acetone (30 mL). A mixture of water (2 mL) and H$_2$O$_2$ (35%, 1 mL, 9 mmol) was added slowly. After the mixture was stirred at room temperature for 1 h, acetone was evaporated and methylene chloride (50 mL) was added. The organic phase was washed with a saturated NaCl solution (35 mL) three times. The organic layer was dried over sodium sulfate. The solvent was removed under vacuum to afford 3.0 g (95%) of a white solid, m.p. 144.7-145.4° C. (lit. 143-144° C.). MS (m/e): 368 (M+). Anal. Calcd. for C$_{21}$H$_{21}$O$_4$P:C, 68.47%; H, 5.75%; P, 8.41%. Found: C, 68.42%; H, 5.72%; P, 8.11%. FT-IR (KBr, cm$^{-1}$): 3068, 3026, 2959, 2837, 1597, 1569, 1503, 1468, 1289, 1254, 1179, 1121, 1019, 803, 671, 543. $^1$H-NMR (CDCl$_3$, δ in ppm): 3.84 (s, 6H, CH$_3$), 6.94-6.97 (dd, 6H, Ar—H), 7.54-7.60 (dd, 6H, Ar—H). $^{13}$C-NMR (DMSO-d$_6$, δ in ppm): 55.29, 114.08, 114.21, 124.19, 125.28, 133.21, 133.32, 161.79, 161.822

(b) Tris(4-hydroxyphenyl)phosphine Oxide. Into a 500 mL 3-neck round bottom flask equipped with stir bar, nitrogen inlet and condenser was charged tris(4-methoxyphenyl) phosphine oxide (25.0 g, 67.9 mmol) followed by pyridine hydrochloride (250 g). The mixture was heated to 210° C. for 2 hours and allowed to cool to about 100° C. It was poured into water to afford 21.0 g (95.0%) of white crystals. m.p.: 274.8-276.8° C. (lit. 275-276° C.). [6] The product was used without further purification. Anal. Calcd. for C$_{18}$H$_{15}$O$_4$P:C, 66.26%; H, 4.63%; P, 9.49%; Found: C, 65.72%; H, 4.68%; P, 9.59%. $^1$H-NMR (DMSO-d$_6$, δ in ppm): 6.84-6.86 (dd, 6H, Ar—H), 7.30-7.45 (dd, 6H, Ar—H), 10.07 (s, 3H, Ar—O—H). $^{13}$C-NMR (DMSO-d$_6$, δ in ppm): 115.32, 115.45, 122.59, 123.69, 133.29, 133.40, 160.28, 160.30.

(c) Tris[4-(4-nitrophenoxy)phenyl]phosphine Oxide. Into a 500 mL 3-neck round bottom flask equipped with stir bar, condenser, and nitrogen inlet were charged tris(4-hydroxyphenyl)phosphine oxide (6.52 g, 20.0 mmol), 1-Fluoro-4-nitrobenzene (9.32 g, 66 mmol), potassium carbonate (9.14 g, 66.0 mmol) and N,N-dimethylformamide (DMF, 100 mL). The mixture was heated at 120° C. for 48 h. Then it was poured into distilled water. The organic layer was extracted with ethyl acetate 3 times and dried over magnesium sulfate. It was filtered and the filtrate was concentrated on a rotary evaporator afford 13.3 g (96%) of golden yellow crystals. m.p. 205.0-206.6° C. FT-IR (cm$^{-1}$): 3071, 1612, 1585, 1523, 1487, 1345, 1242, 1176, 1116, 879, 866, 831, 788, 696, 556. Anal. Calcd. for C$_{36}$H$_{24}$N$_3$O$_{10}$P:C, 62.70%; H, 3.51%; N, 6.09%; P, 4.49%; Found: C, 62.63%; H, 3.50%; N, 6.06%; P, 4.40%. Mass Spectrum (m/e): 689 (M+). $^1$H-NMR (DMSO-d$_6$, δ in ppm): 7.27-7.31 (d, 6H, Ar—H), 7.35-7.37 (d, 6H, Ar—H), 7.75-7.80 (d, 6H, Ar—H), 8.27-8.31 (d, 6H, Ar—H). $^{13}$C-NMR (DMSO-d$_6$, δ in ppm): 118.84, 119.82, 119.94, 126.22, 128.18, 129.23, 134.09, 134.20, 143.09, 157.93, 157.96, 161.29.

(d) Tris[4-(4-aminophenoxy)phenyl]phosphine Oxide. Tris [4-(4-nitrophenoxy)phenyl]phosphine Oxide (8.0 g, 11.6 mmol), DMF (120 mL) and 5% palladium on activated carbon (0.50 g) were added to a hydrogenation bottle. The bottle was secured on a Parr hydrogenation apparatus, flushed three times with hydrogen, and then pressurized to 60 psi. After the mixture was agitated at room temperature for 24 h under the hydrogen pressure of 60 psi, it was filtered through Celite. The filter cake was washed with DMF, and then the filtrate was poured into water. The precipitate was collected and recrystallized from ethanol/water to afford 6.40 g (99%) of white crystals. m.p. 211.1-211.5° C. MS (m/e): 599 (M+). Anal. Calcd. for $C_{36}H_{30}N_3O_4P$:C, 72.11%; H, 5.04%; N, 7.01%. Found: C, 72.01%; H, 4.97%; N, 6.91%. FT-IR (KBr, cm$^{-1}$): 3437, 3328 (NH$_2$), 3210, 3042, 1592, 1507, 1493, 1243, 1197, 1165, 1117, 871, 830, 671, 577. $^1$H-NMR (DMSO-d$_6$, δ in ppm): 5.06 (s, 6H, NH$_2$), 6.59-6.62 (d, 6H, Ar—H), 6.79-6.81 (d, 6H, Ar—H), 6.94-6.96 (dd, 6H, Ar—H), 7.48-7.53 (dd, 6H, Ar—H). $^{13}$C-NMR (DMSO-d$_6$, δ in ppm): 114.85, 115.89, 116.01, 121.34, 125.06, 126.13, 133.40, 133.51, 144.11, 146.13, 161.89, 161.92.

(e) Tris[4-(3,4-dicyanophenoxy)phenyl]phosphine Oxide. Into a 500 mL 3-neck round bottom flask equipped with stir bar, condenser, and nitrogen inlet were charged tris(4-hydroxyphenyl)phosphine oxide (8.13 g, 25.0 mmol), 4-nitrophthalonitrile (13.0 g, 75.0 mmol), K$_2$CO$_3$ (11.5 g, 85.5 mmol), and DMF (150 mL). The mixture was heated at 50° C. for 24 h. Then it was poured into distilled water. The organic layer was extracted with ethyl acetate 3 times and dried over magnesium sulfate. It was filtered and the filtrate was dried on a rotary evaporator afford 15.8 g (81%) of a yellow powder. m.p. 205.0-206.6° C. m.p. 127.6-132.8° C. It was purified by slurred in ethyl acetate. m.p. 138.1-139.4° C. Anal. Calcd. for $C_{42}H_{21}N_6O_4P$:C, 71.59%; H, 3.00%; N, 11.93%. Found: C, 71.41%; H, 2.99%; N, 11.59%. $^1$H-NMR (DMSO-d$_6$, δ in ppm): 7.33-7.35 (dd, 6H, Ar—H), 7.54-7.57 (dd, 3H, Ar—H), 7.73-7.78 (dd, 6H, Ar—H), 7.95-7.96 (d, 3H, Ar—H) 8.14-8.16 (d, 3H, Ar—H). $^{13}$C-NMR (DMSO-d$_6$, δ in ppm): 109.40, 115.28, 115.77, 116.87, 119.78, 119.90, 128.47, 129.53, 134.19, 134.30, 136.30, 136.40, 157.41, 157.44, 159.59.

(f) Tris[4-(3,4-dicarboxyphenoxy)phenyl]phosphine Oxide. Into a 250 mL 3-neck round bottom flask equipped with stir bar, condenser, and nitrogen inlet were charged tris[4-(3,4-dicyanophenoxy)phenyl]phosphine oxide (2.5 g, 3.2 mmol), KOH (2.7 g, 48 mmol), and ethanol/water (1:1, 60 mL). The mixture was heated under reflux for 12 h until it formed a clear solution. It was allowed to cool to room temperature and neutralized with conc. HCl solution to pH 1-3. The white precipitate was collected and dried in oven to afford 2.60 g (99%) of white crystals. m.p. >300° C. $^1$H-NMR (DMSO-d$_6$, δ in ppm): 7.22-7.27 (m, 12H, Ar—H), 7.67-7.72 (dd, 6H, Ar—H), 7.76-7.78 (d, 3H, Ar—H). $^{13}$C-NMR (DMSO-d$_6$, δ in ppm): 118.35, 118.90, 119.02, 120.51, 127.35, 127.40, 128.46, 131.40, 134.02, 134.13, 136.46, 157.46, 158.83, 158.86, 167.52, 168.21.

(g) Tris[4-(3,4-dicarboxyphenoxy)phenyl]phosphine Oxide trianhydride. Into a 100 mL 3-neck round bottom flask equipped with stir bar, condenser, and nitrogen inlet were charged tris[4-(3,4-dicarboxyphenoxy)phenyl]phosphine oxide (2.0 g, 2.44 mmol), acetic acid (7 mL), and acetic anhydride (15 mL). The mixture was refluxed for 4 h until it formed a clear solution, which was then filtered while hot to remove insoluble impurities. After cooling to room temperature, the crystallized solid was collected, washed with dry toluene, and dried under vacuum to afford 1.4 g (75%) of golden yellow crystals. m.p. 151.8-152.1° C. Anal. Calcd. for $C_{42}H_{21}O_{13}P$:C, 65.98%; H, 2.77%; N, 0%; P, 4.05%. Found: C, 65.34%; H, 2.91%; N, <0.1%; P, 3.94. $^1$H-NMR (DMSO-d$_6$, δ in ppm): 7.34-7.36 (dd, 6H, Ar—H), 7.62-7.65 (dd, 3H, Ar—H), 7.66-7.68 (dd, 3H, Ar—H), 7.77-7.82 (dd, 6H, Ar—H), 8.01-8.12 (d, 3H, Ar—H. $^{13}$C-NMR (DMSO-d$_6$, δ in ppm): 114.48, 119.75, 119.88, 125.95, 125.98, 127.94, 128.39, 129.44, 134.18, 134.26, 134.37, 157.92, 157.95, 162.29, 162.40, 162.47.

Example 13. Synthesis/Characterization of Linear CP2

APB diamine (1.169 g, 4.000 mmol) and DMAc (14.7 mL) were added to a 50 mL 3-necked flask equipped with a magnetic stirrer, nitrogen inlet and outlet, and stirred under dry nitrogen at room temperature for 30 min. 6FDA dianhydride (1.777, 4.000 mmol) was then charged. The light yellow solution was agitated at room temperature overnight to afford a viscous poly(amic acid) solution. This solution was diluted with DMAc (4-6 mL), poured into a glass dish, followed by vacuum evaporation of DMAc at 50° C., and heat-treated at: 100° C./1 hr, 150° C./1 hr, 175° C./1 hr, 200° C./1 hr, 250° C./1 hr and 300° C./1 hr to form imidized CP2 films. The film thickness was approximately 50-150 µm. ATR-IR (cm-1): 3077, 1785, 1719, 1585, 1478, 1452, 1474, 1236, 1188, 1140, 1092, 962, 845, 780, 719, 627, 591, 568, 544, 527.

Example 14. Synthesis/Characterization of XCP2-Am5

APB (1.081 g, 3.700 mmol) and DMAc (12 g) were added to a 50 mL 3-necked flask equipped with a magnetic stirrer, nitrogen inlet and outlet, and stirred under dry nitrogen at room temperature for 30 min. 6FDA (1.777, 4.000 mmol) was then introduced to the resulting solution. The light yellow solution was agitated at room temperature overnight to afford a poly(amic acid) solution. Then, TAPO triamine (0.120 g, 0.200 mmol) was added to this solution. After TAPO had completely dissolved in DMAc, the mixture poured into a glass petri dish, followed by vacuum evaporation of DMAc at 50° C., and heat-treated according to following schedule: 100° C./1 hr, 150° C./1 hr, 175° C./1 hr, 200° C./1 hr, 250° C./1 hr and 300° C./1 hr to form polyimide films. The film thickness was approximately 50-150 µm. ATR-IR (cm$^{-1}$): 3076, 1784, 1720 (C=O) 1586, 1478, 1449, 1368, 1298, 1189 (—O—), 1141 (—O—), 1098, 1003, 846, 811, 779, 718, 681, 627, 568.

Example 15. Representative Procedure as Exemplified for the Synthesis of Phosphine-Oxide Triamine-Crosslinked Co-Polyimides Using PE25-XCP2-Am5

APB (0.3945 g, 1.350 mmol), PE-BPDA (0.1562 g, 0.500 mmol) and DMAc (10 g) were added to a 50 mL 3-necked flask equipped with a magnetic stirrer, nitrogen inlet and outlet, and stirred under dry nitrogen at room temperature for 30 min. 6FDA (0.8885, 2.000 mmol) was then introduced to the resulting solution. The light yellow solution was agitated at room temperature overnight to afford a poly(amic acid) solution. Then, TAPO triamine (0.060 g, 0.100 mmol) was added to this solution. After TAPO had completely dissolved in DMAc, the mixture poured into a glass petri dish, followed by vacuum evaporation of DMAc at 50° C., and heat-treated according to following schedule: 100° C./1 hr, 150° C./1 hr, 175° C./1 hr, 200° C./1 hr, 250° C./1 hr and 300° C./1 hr to form polyimide films. The film thickness was approximately 50-150 µm. ATR-IR (cm-1): 3080, 1785, 1719, 1585, 1508, 1478, 1452, 1374, 1298, 1236, 1188, 1140, 1092, 962, 845, 780, 719, 680, 591, 568, 544, 527.

Table 1: Polyimide compositions and film properties of linear CP2, XCP2-Am5, PEx-XCP2-Amb (5 mol % POTAm; x=25, 40 or 50 mol % of PE-BPDA) and PE100-

XODA/PE-BPDA-Am5 (5 mol % POTAm; x=100 mol % of PE-BPDA and 100 mol % of oxydiphthalic anhydride) samples.

| Sample | 6FDA (mol %) | APB (mol %) | PE-BPDAm (mol %) | $T_{g,1}$; $T_{g,2}^a$ (°C.) | $E^b$ (GPa) | $T_{d5\%}^c$ (°C.); air | $M_c^d$ | Gel Content$^e$ | Swelling Ratio$^e$ |
|---|---|---|---|---|---|---|---|---|---|
| Linear CP2 | 100 | 100 | 0 | 219; NA$^f$ | 1.90 ± 0.15 | 526 | — | — | — |
| XCP2-Am5$^a$ | 100 | 92.5 | 0 | 210; NA$^f$ | 2.24 ± 0.24 | 511 | 9,350 | 98.8 | 3.02 |
| PE25-XCP2-Am5- | 100 | 67.5 | 25 | 224; 258 | 1.30 ± 0.11 | 456 | 9440 | 99.2 | 2.94 |
| PE50-XCP2-Am5 | 100 | 42.5 | 50 | 235; 400 | 1.39 ± 0.11 | 467 | 9510 | 99.4 | 2.87 |
| PE100-XOPDA-Am5 | OPDA 100 | 0 | 92.5 | 247; >400 | 1.53 ± 0.14 | 527 | 9630 | 99.9 | 1.06 |
| PE100-XBPADA-Am5 | BPADA 100 | 0 | 92.5 | 225; 354 | 1.73 ± 0.21 | 496 | 9840 | 73.6 | 4.56 |

Note: (a) $T_{g,1}$ is the initial glass transition temperature determined after DSC san to 300° C. and $T_{g,1}$ is "cured Tg" after DSC recan from 25° C. to 450-470° C. (b). Modulus determined by DMA. (c) Temperature at which 5% Weight loss is observed by TGA. (d) Mc is the theoretical molecular weight of chains between crosslinks; (e) Swelling test procedure: Films weighed at room temp (Wi). Films immersed in DMAc (2 days). Gel rinsed in fresh DMAc (2X) to remove soluble fractions, wiped with tissue paper and weighed (Wg). Gel heat-treated in an oven at 300° C. Crosslinked CP2 weighed at room temperature (Wx). Gel Content=Wi/Wx×100%; Swelling Ratio=Wg/Wx×100%; (f) Not applicable.

While the present invention has been illustrated by the description of one or more embodiments thereof, and while the embodiments have been described in considerable detail, they are not intended to restrict or in any way limit the scope of the appended claim to such detail. Additional advantages and modification will be readily apparent to those skilled in the art. The invention in its broader aspects is therefore not limited to the specific details, representative apparatus and methods and illustrative examples shown and described. Accordingly, departures may be made from such details without departing from the scope or the spirit of the general inventive concept exemplified herein.

What is claimed is:

1. A method for fabricating a shape memory polymer into a three-dimensional object, comprising:
    a) treating a solution comprising:
        (i) a polymeric intermediate comprising repeat units and non-terminal, phenylethynyl moieties, each of said repeat units comprising one of said non-terminal, phenylethynyl moieties; said polymeric intermediate being selected from the group consisting of a poly(amic acid) intermediate, a poly(amide-amic acid) intermediate, a copolymer intermediate of poly(amic acid) and poly(amide-amic acid), and mixtures thereof;
        (ii) a solvent;
        with a multi-functional crosslinking agent to thereby form a sol-gel comprising a crosslinked poly(amic acid), a crosslinked poly(amide-amic acid) and/or a crosslinked copolymer of poly(amic acid) and poly(amide-amic acid), said crosslinked poly(amic acid), a crosslinked poly(amide-amic acid) and/or a crosslinked copolymer of poly(amic acid) and poly(amide-amic acid) comprising repeat units and non-terminal, phenylethynyl moieties each of said repeat units comprising one of said non-terminal, phenylethynyl moieties, said multi-functional crosslinking agent comprising at least a tri-functionalized amine crosslinking agent when said polymeric intermediate is anhydride end-functionalized and said multi-functional crosslinking agent comprising at least a tri-functionalized anhydride crosslinking agent when said polymeric intermediate is amine end-functionalized;
    b) forming a film of said sol-gel on a substrate to provide a laminated substrate;
    c) evaporating at least a portion of the solvent from the sol-gel by heating the sol-gel to a temperature in a range of about 50° C. to about 100° C. at a pressure less than about atmospheric pressure;
    d) forming the laminated substrate into a first configuration that is in a three-dimensional form;
    e) imidizing, via heating, said sol-gel to provide the shape memory polymer having a permanent shape corresponding to the first configuration, wherein the shape memory polymer comprises a crosslinked polyimide, a crosslinked poly(amide-imide) and/or a crosslinked polyimide poly(amide-imide) copolymer comprising repeat units and non-terminal, phenylethynyl moieties each of said repeat units comprising one of said non-terminal, phenylethynyl moieties; and
    f) removing the substrate from the laminated substrate to provide the three-dimensional object comprising the shape memory polymer;
    g) optionally, heating said shape memory polymer to a temperature of from about 210° C. to 250° C. and then placing said shape memory polymer under tension to a new shape.

2. The method for fabricating a shape memory polymer into a three-dimensional object according to claim 1 wherein said crosslinking agent comprises a phosphine-oxide triamine or a phosphine-oxide trianhydride.

3. The method for fabricating a shape memory polymer into a three-dimensional object according to claim 1 further comprising crosslinking said non-terminal, phenylethynyl moieties by heating said substrate to a temperature of from greater than 250° C. to about 400° C.

4. The method of claim 1, wherein the substrate comprises a metal that dissolves in an aqueous acid solution.

5. The method of claim 1, wherein the multi-functional anhydride crosslinking agent has the following chemical formula:

wherein Z represents an anhydride functional group that is directly or indirectly bonded to Ar; Ar represents an aryl group that is directly bonded to W; and n is equal to 3 when W is P=O or N, or n is equal to 4 when W is Si or a carbon moiety.

6. The method of claim 5, wherein Ar is a phenyleneoxy group (—OPh-) that is para- or meta-substituted with respect to oxygen, and the multi-functional anhydride crosslinking agent has the following chemical formula:

7. The method of claim 5, wherein Z and Ar in combination form a phthalic anhydride moiety that is directly bonded to W.

8. The method of claim 5, wherein Ar is a phenyleneoxy group (—OPh-) that is para- or meta-substituted with respect to oxygen, and wherein Z is a phthalic anhydride group that is connected to the phenyleneoxy group through an ether bond.

9. The method of claim 5, wherein W is P=O, wherein Ar is a phenyleneoxy group (—OPh-) that is para- or meta-substituted with respect to oxygen, and wherein the multi-functional anhydride crosslinking agent has the following chemical formula:

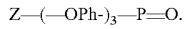

10. The method of claim 9, wherein Z is a phthalic anhydride group that is connected to the phenyleneoxy group through an ether bond, and wherein the multi-functional anhydride crosslinking agent has the following chemical formula:

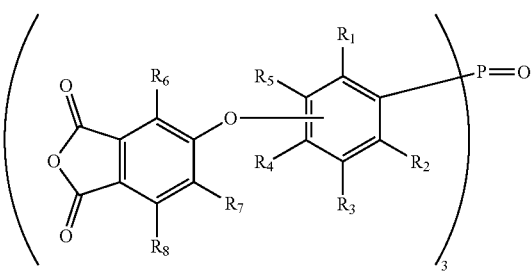

wherein $R_1$ through $R_8$ are each independently selected from H or $C_1$-$C_4$ alkyl.

11. The method of claim 10, wherein the agent is selected from tris[3-(3,4-dicarboxyphenoxy)phenyl]phosphine oxide trianhydride or tris[4-(3,4-dicarboxyphenoxy)phenyl]phosphine oxide trianhydride.

12. The method of claim 5, wherein W is N, wherein Ar is a phenyleneoxy group (—OPh-) that is para- or meta-substituted with respect to oxygen, and wherein the multi-functional anhydride crosslinking agent has the following chemical formula:

13. The method of claim 12, wherein Z is a phthalic anhydride group that is connected to the phenyleneoxy group through an ether bond, and wherein the multi-functional anhydride crosslinking agent has the following chemical formula:

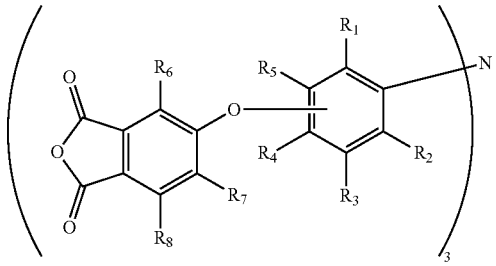

wherein $R_1$ through $R_8$ are each independently selected from H or $C_1$-$C_4$ alkyl.

14. The method of claim 12, wherein the multi-functional anhydride crosslinking agent is selected from tris[3-(3,4-dicarboxyphenoxy)phenyl]amine trianhydride or tris[4-(3,4-dicarboxyphenoxy)phenyl]amine trianhydride.

15. The method of claim 5, wherein W is N, wherein Z and Ar in combination form a phthalic anhydride moiety that is directly bonded to N, and wherein the multi-functional anhydride crosslinking agent has the following chemical formula:

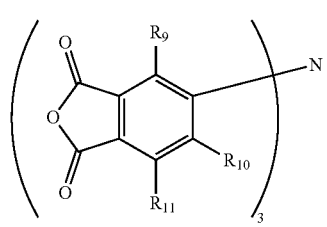

wherein $R_9$ to $R_{11}$ are each independently selected from H or $C_1$-$C_4$ alkyl.

16. The method of claim 1, wherein the multi-functional amine crosslinking agent comprises a tri(oxybenzene-amine) crosslinker having the following chemical formula:

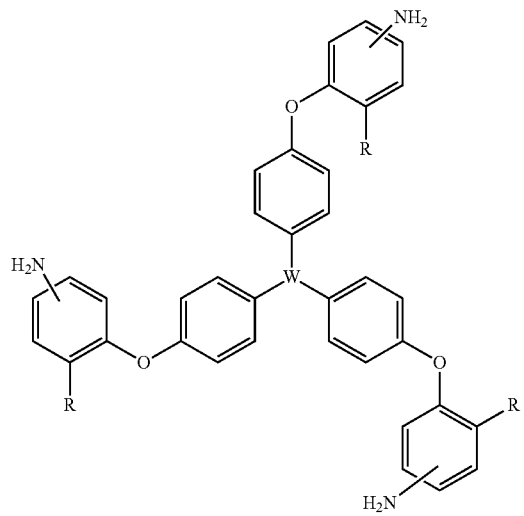

wherein W is selected from a group consisting of $CH_3C$, N, $P=O$, or $BO_3$; R is selected from a group consisting of H, F, Cl, $CF_3$, or $CH_3$; and the amine groups are located meta or para with respect to R.

* * * * *